United States Patent
Li et al.

(10) Patent No.: US 12,204,236 B2
(45) Date of Patent: Jan. 21, 2025

(54) LASER SOURCE AND LASER PROJECTION APPARATUS

(71) Applicant: Hisense Laser Display Co., Ltd, Qingdao (CN)

(72) Inventors: Wei Li, Qingdao (CN); Xiaoqiang Gu, Qingdao (CN); Wuyue Han, Qingdao (CN); Youliang Tian, Qingdao (CN)

(73) Assignee: HISENSE LASER DISPLAY CO., LTD, Qingdao (CN)

( * ) Notice: Subject to any disclaimer, the term of this patent is extended or adjusted under 35 U.S.C. 154(b) by 3 days.

(21) Appl. No.: 17/729,489

(22) Filed: Apr. 26, 2022

(65) Prior Publication Data

US 2023/0359113 A1 Nov. 9, 2023

Related U.S. Application Data

(63) Continuation-in-part of application No. PCT/CN2021/101573, filed on Jun. 22, 2021, and a
(Continued)

(30) Foreign Application Priority Data

Jun. 22, 2020 (CN) .......................... 202010576381.2
Jun. 22, 2020 (CN) .......................... 202010576383.3

(51) Int. Cl.
*G03B 21/20* (2006.01)
*G03B 33/12* (2006.01)

(52) U.S. Cl.
CPC ....... *G03B 21/204* (2013.01); *G03B 21/2066* (2013.01); *G03B 33/12* (2013.01)

(58) Field of Classification Search
CPC .. G03B 21/204; G03B 21/2066; G03B 33/12; G03B 33/08
See application file for complete search history.

(56) References Cited

U.S. PATENT DOCUMENTS 10,368,043 B2 7/2019 Chiu et al.
10,451,959 B2 10/2019 Kamijima et al.
(Continued)

FOREIGN PATENT DOCUMENTS

CN 102929086 A 2/2013
CN 104698729 A 6/2015
(Continued)

OTHER PUBLICATIONS

Chinese Office Action dated Nov. 21, 2022, issued in corresponding Chinese Patent Application No. 202010576381.3 with English Translation.
(Continued)

*Primary Examiner* — Magda Cruz
(74) *Attorney, Agent, or Firm* — Morgan, Lewis & Bockius LLP

(57) ABSTRACT

A laser source includes a light-emitting assembly, a phosphor wheel, a converging lens group, and a combining component. The combining component is disposed between the light-emitting assembly and the converging lens group. The combining component has a plurality of light reflecting regions and a plurality of laser transmitting regions, and the plurality of light reflecting regions and the plurality of laser transmitting regions are alternately arranged. The plurality of laser transmitting regions are configured to transmit the laser beam emitted by the light-emitting assembly, and the plurality of light reflecting regions are configured to reflect a laser beam reflected by the laser-reflecting region of the phosphor wheel and a fluorescent beam excited by the fluorescence-exciting region of the phosphor wheel toward a beam outlet of the laser source.

18 Claims, 21 Drawing Sheets

Related U.S. Application Data continuation-in-part of application No. PCT/CN2021/101567, filed on Jun. 22, 2021.

(56) References Cited

U.S. PATENT DOCUMENTS

| | | | |
|---|---|---|---|
| 2011/0310353 A1 | 12/2011 | Maeda | |
| 2012/0242912 A1 | 9/2012 | Kitano | |
| 2014/0285774 A1 | 9/2014 | Tajiri | |
| 2015/0153636 A1 | 6/2015 | Hartwig | |
| 2015/0362830 A1* | 12/2015 | Liao | G03B 21/2066 353/31 |
| 2018/0164669 A1 | 6/2018 | Tian et al. | |
| 2018/0299757 A1 | 10/2018 | Liao | |
| 2019/0072245 A1* | 3/2019 | Kobayashi | G03B 21/204 |
| 2019/0211263 A1* | 7/2019 | Maeda | F21S 2/00 |
| 2019/0285977 A1 | 9/2019 | Tian et al. | |
| 2020/0019049 A1 | 1/2020 | Liu et al. | |
| 2020/0073218 A1 | 3/2020 | Yamamoto | |
| 2020/0103737 A1* | 4/2020 | Kawasumi | G02B 27/102 |
| 2020/0124952 A1 | 4/2020 | Guo et al. | |
| 2020/0271300 A1 | 8/2020 | Guo et al. | |
| 2020/0341359 A1 | 10/2020 | Hayashi et al. | |

FOREIGN PATENT DOCUMENTS

| | | |
|---|---|---|
| CN | 106125314 A | 11/2016 |
| CN | 107315312 A | 11/2017 |
| CN | 107861324 A | 3/2018 |
| CN | 108572497 A | 9/2018 |
| CN | 108732851 A | 11/2018 |
| CN | 108931880 A | 12/2018 |
| CN | 109375463 A | 2/2019 |
| CN | 110543073 A | 12/2019 |
| CN | 111025833 A | 4/2020 |
| CN | 111213005 A | 5/2020 |
| JP | 2014-075221 A | 4/2014 |

OTHER PUBLICATIONS

Office Action issued in corresponding Chinese Patent Application No. 202010576383.2 dated Apr. 21, 2022, with English translation.
International Search Report and Written Opinion issued in corresponding International Application No. PCT/CN2021/101573 dated Sep. 6, 2021, with English translation.
International Search Report and Written Opinion issued in corresponding International Application No. PCT/CN2021/101567 dated Sep. 1, 2021, with English translation.
Chinese Office Action dated May 27, 2023, issued in corresponding Chinese Patent Application No. 202010576381.3.
U.S. Notice of Allowance dated May 23, 2023, issued in corresponding U.S. Appl. No. 17/725,868.
Office Action issued on May 30, 2024 in U.S. Appl. No. 17/730,353 Note: U.S. Appl. No. 17/730,353 cited therein is already of record.
Final Office Action issued in corresponding U.S. Appl. No. 17/730,353 dated Oct. 28, 2024.

* cited by examiner

102

102

LASER SOURCE AND LASER PROJECTION APPARATUS

CROSS-REFERENCE TO RELATED APPLICATIONS

This application is a continuation-in-part application of International Application No. PCT/CN2021/101567 filed on Jun. 22, 2021, which claims priority to Chinese Patent Application No. 202010576381.3 filed on Jun. 22, 2020; and this application is a continuation-in-part application of International Application PCT/CN2021/101573 filed Jun. 22, 2021, which claims priority to Chinese Patent Application No. 202010576383.2 filed on Jun. 22, 2020. The entire contents of the foregoing applications are hereby incorporated by reference herein.

TECHNICAL FIELD

The present disclosure relates to the field of laser projection technologies, and in particular, to a laser source and a laser projection apparatus.

BACKGROUND

With a popularization and application of laser projection apparatuses, demands of consumers for miniaturized laser projection apparatuses have gradually increased. In order to achieve a miniaturization of the laser projection apparatus, not only basic illumination function should be realized, but also a volume, cost and optical efficiency should be taken into account in a design of laser source products.

SUMMARY

In an aspect, a laser source is provided. The laser source includes a light-emitting assembly, a phosphor wheel, a converging lens group and a combining component. The light-emitting assembly is configured to emit a laser beam. The phosphor wheel includes a fluorescence-exciting region and a laser-reflecting region. The fluorescence-exciting region is configured to emit a fluorescent beam with a color different from a color of the laser beam under excitation of the laser beam emitted by the light-emitting assembly, and the laser-reflecting region is configured to reflect the laser beam emitted by the light-emitting assembly. The converging lens group is disposed between the light-emitting assembly and the phosphor wheel, and is configured to converge the laser beam emitted by the light-emitting assembly to the phosphor wheel. The combining component is disposed between the light-emitting assembly and the converging lens group. The combining component has a plurality of light reflecting regions and a plurality of laser transmitting regions, and the plurality of light reflecting regions and the plurality of laser transmitting regions are alternately arranged. The plurality of laser transmitting regions are configured to transmit the laser beam emitted by the light-emitting assembly, and the plurality of light reflecting regions are configured to reflect a laser beam reflected by the laser-reflecting region of the phosphor wheel and a fluorescent beam excited by the fluorescence-exciting region of the phosphor wheel toward a beam outlet of the laser source.

In another aspect, a laser projection apparatus is provided. The laser projection apparatus includes a laser source, an optical engine and a projection lens. The laser source is a laser source described in the above embodiments. The laser source is configured to emit illumination beams. The optical engine is configured to modulate the illumination beams emitted by the laser source, so as to obtain projection beams. The projection lens is configured to image the projection beams.

BRIEF DESCRIPTION OF THE DRAWINGS

In order to describe technical solutions in the present disclosure more clearly, accompanying drawings to be used in some embodiments of the present disclosure will be introduced briefly below. However, the accompanying drawings to be described below are merely accompanying drawings of some embodiments of the present disclosure, and a person of ordinary skill in the art may obtain other drawings according to these drawings. In addition, the accompanying drawings in the following description may be regarded as schematic diagrams, and are not limitations on actual size of products, actual processes of methods and actual timings of signals to which the embodiments of the present disclosure relate.

DETAILED DESCRIPTION

Figure 1:
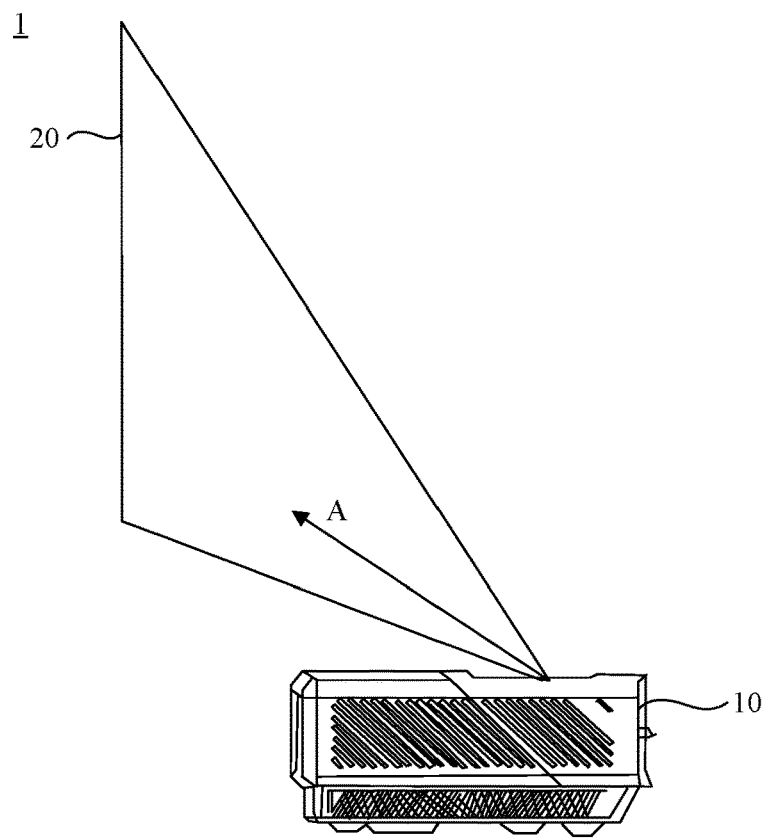
FIG. 1 is a diagram showing a structure of a laser projection apparatus, in accordance with some embodiments.

Technical solutions in some embodiments of the present disclosure will be described clearly and completely below with reference to the accompanying drawings. However, the described embodiments are merely some but not all embodiments of the present disclosure. All other embodiments obtained on a basis of the embodiments of the present disclosure by a person of ordinary skill in the art shall be included in the protection scope of the present disclosure.

Unless the context requires otherwise, throughout the specification and the claims, the term "comprise" and other forms thereof such as the third-person singular form "comprises" and the present participle form "comprising" are construed as being open and inclusive, meaning "including, but not limited to". In the description, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics described herein may be included in any one or more embodiments or examples in any suitable manner.

Hereinafter, the terms "first" and "second" are only used for descriptive purposes, and cannot be construed as indicating or implying the relative importance or implicitly indicating the number of indicated technical features. Thus, features defined with "first" and "second" may explicitly or implicitly include one or more of the features. In the description of the embodiments of the present disclosure, the term "a plurality of" means two or more unless otherwise specified.

In the description of some embodiments, the term "coupled" and "connected" and their extensions may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B and C" has a same meaning as the phrase "at least one of A, B or C", and both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

The use of the phrase "applicable to" or "configured to" herein means an open and inclusive language, which does not exclude devices that are applicable to or configured to perform additional tasks or steps.

The term such as "about", "substantially" or "approximately" as used herein includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

Some embodiments of the present disclosure provide a laser projection apparatus. As shown in FIG. 1, the laser projection apparatus 1 includes a projection host 10 and a projection screen 20.

Figure 2:
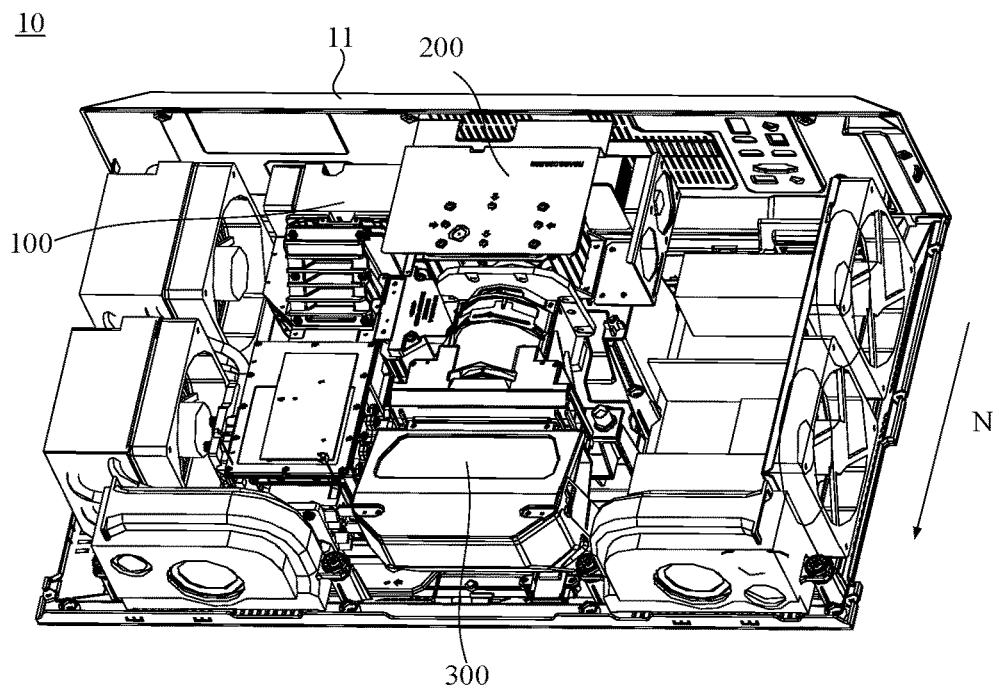
FIG. 2 is a diagram showing a structure of a projection host in a laser projection apparatus, in accordance with some embodiments.

In some embodiments, as shown in FIG. 2, the projection host 10 includes a housing 11 (only a portion of the housing 11 being shown in FIG. 2), and a laser source 100, an optical engine 200, and a projection lens 300 that are assembled in the housing 11. The laser source 100 is configured to provide illumination beams (laser beams). The optical engine 200 is configured to modulate the illumination beams provided by the laser source 100 with image signals, so as to obtain projection beams. The projection lens 300 is configured to project the projection beams on the projection screen 20 for imaging.

The laser source 100, the optical engine 200, and the projection lens 300 are sequentially connected in a propagation direction of beams, and are each wrapped by a corresponding housing. The housings of the laser source 100, the optical engine 200 and the projection lens 300 support their corresponding optical components respectively and make the optical components meet certain sealing or airtight requirements. For example, the laser source 100 is hermetically sealed through its corresponding housing, which may well solve a light attenuation problem of the laser source 100.

Figure 3:
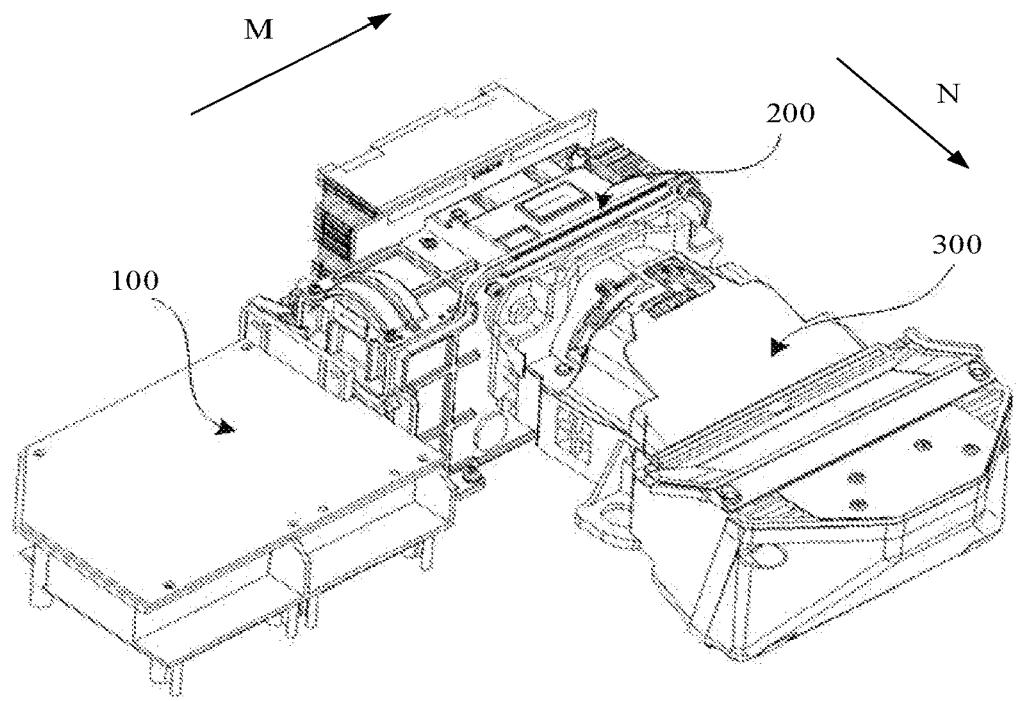
FIG. 3 is a diagram showing a structure of a laser source, an optical engine, and a projection lens in a laser projection apparatus, in accordance with some embodiments.

In some embodiments, an end of the optical engine 200 is connected to the laser source 100, and another end of the optical engine 200 is connected to the projection lens 300. The laser source 100 and the optical engine 200 are arranged in an exit direction of the illumination beams of the projection host 10 (referring to the M direction shown in FIG. 3), and the optical engine 200 and the projection lens 300 are arranged in an exit direction of the projection beams of the projection host 10 (referring to the N direction shown in FIG. 3), the M direction is substantially perpendicular to the N direction. That is, the laser source 100, the optical engine 200, and the projection lens 300 are connected in an "L" shape. On one hand, such a connection structure may adapt to characteristics of a beam path of a reflective light valve in the optical engine 200, and on another hand, it is also conducive to shortening a length of a beam path in a one-dimensional direction, which is helpful for structural arrangement of the projection host 10. For example, in a case where the laser source 100, the optical engine 200, and the projection lens 300 are disposed in the one-dimensional direction (e.g., the M direction), a length of a beam path in the one-dimensional direction is long, which is not conducive to the structural arrangement of the projection host 10. The reflective light valve will be described below.

In some embodiments, the laser source 100 may provide beams of three primary colors sequentially (beams of other colors may also be added on a basis of the beams of three primary colors). Due to a phenomenon of visual persistence of human eyes, what the human eyes see is white beams formed by mixing the beams of three primary colors. Alternatively, the laser source 100 simultaneously outputs the beams of three primary colors, so as to continuously emit the white beams. The laser source 100 includes a laser device. The laser device emits laser beams of at least one color, such as blue laser beams.

Figure 4:
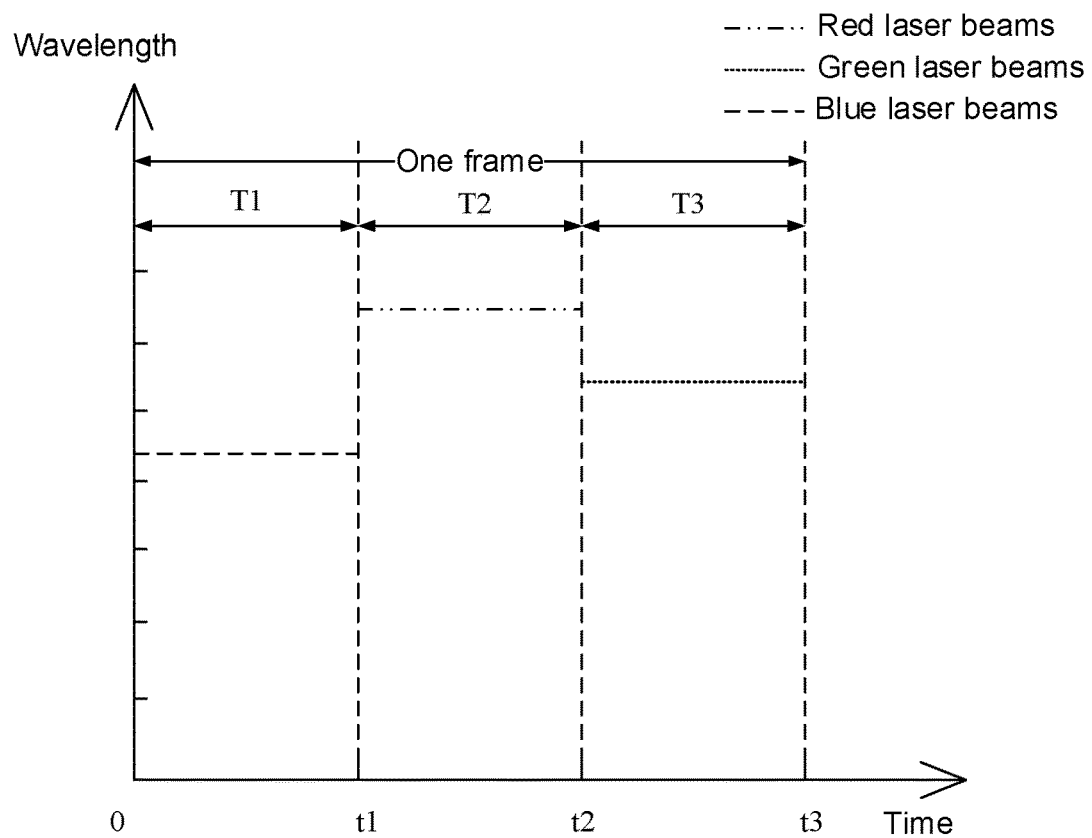
FIG. 4 is a timing diagram of a laser source in a laser projection apparatus, in accordance with some embodiments.

For example, as shown in FIG. 4, during a projection process of a frame of target image, the laser source 100 sequentially outputs blue laser beams, red laser beams and green laser beams. The laser source 100 outputs the blue laser beams in a time period T1, the red laser beams in a time period T2, and the green laser beams in a time period T3. A time for the laser source 100 to accomplish the sequential output of each primary color beam once is a cycle for the laser source 100 to output the primary color beams. In a display cycle of the frame of target image, the laser source 100 performs the sequential output of each primary color beam once. Therefore, the display cycle of the frame of target image is equal to the cycle for the laser source 100 to output the primary color beams, and they both equal to a sum of T1, T2 and T3.

Figure 5:
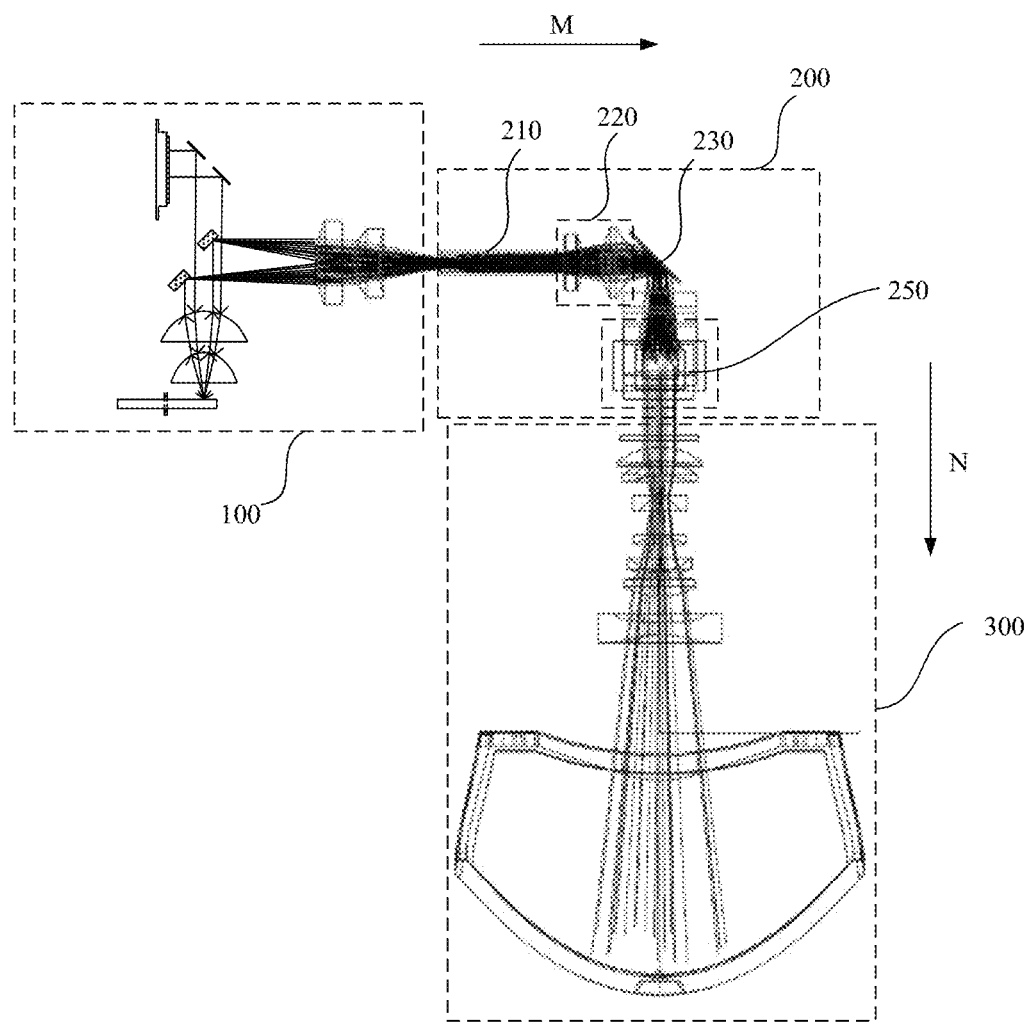
FIG. 5 is a diagram showing a beam path of a laser source, an optical engine, and a projection lens in a laser projection apparatus, in accordance with some embodiments.
Figure 6:
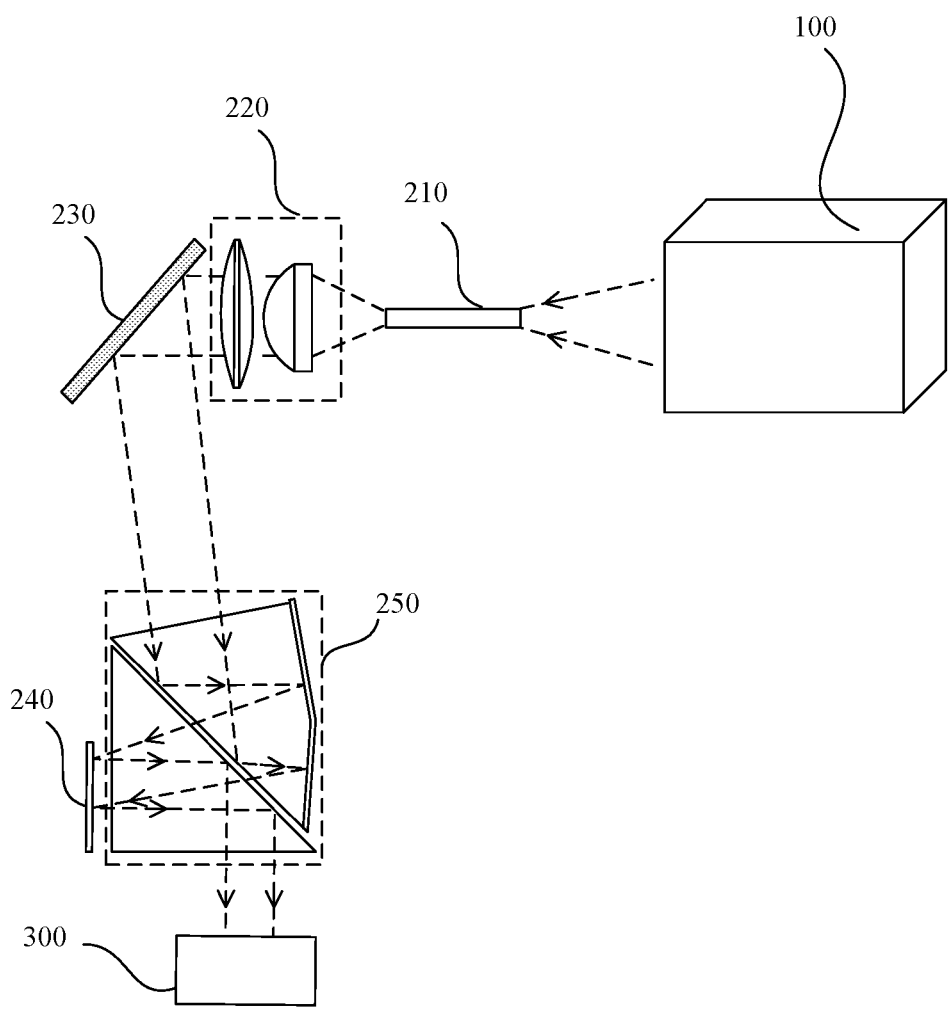
FIG. 6 is a diagram showing another beam path of a laser source, an optical engine, and a projection lens in a laser projection apparatus, in accordance with some embodiments.

The illumination beams emitted by the laser source 100 enter the optical engine 200. Referring to FIGS. 5 and 6, the optical engine 200 includes a light pipe 210, a lens assembly 220, a reflector 230, a digital micromirror device (DMD) 240 and a prism assembly 250. The light pipe 210 may receive the illumination beams provided by the laser source 100 and homogenize the illumination beams. In addition, an outlet of the light pipe 210 may be rectangular, so as to have a shaping effect on a beam spot. The lens assembly 220 may first collimate the illumination beams, and then converge the collimated illumination beams and emit the converged illumination beams to the reflector 230. The reflector 230 may reflect the illumination beams to the prism assembly 250. The prism assembly 250 reflects the illumination beams to the digital micromirror device 240. The digital micromirror device 240 modulates the illumination beams, so as to obtain the projection beams, and reflects the projection beams into the projection lens 300.

In the optical engine 200, the DMD 240 is a core component, which plays a role of modulating the illumination beams provided by the laser source 100 through the image signals. That is, the DMD 240 controls the illumination beams to display different colors and luminance according to different pixels of an image to be displayed, so as to finally form an optical image. Therefore, the DMD 240 is also referred to as an optical modulator or a light valve. Depending on whether the optical modulator (or the light valve) transmits or reflects the illumination beams, the optical modulator (or the light valve) may be classified as a transmissive optical modulator (or light valve) or a reflective optical modulator (or light valve). For example, the DMD 240 shown in FIG. 6 reflects the illumination beams, and thus it is the reflective optical modulator. A liquid crystal light valve transmits the illumination beams, and thus it is the transmissive optical modulator. In addition, according to a number of the optical modulators (or the light valves) used in the optical engine 200, the optical engine 200 may be classified as a single-chip system, a double-chip system, or a three-chip system. For example, only one DMD 240 is used in the optical engine 200 shown in FIG. 6, and thus the optical engine 200 may be referred to as the single-chip system. In a case where three digital micromirror devices 240 are used, the optical engine 200 may be referred to as the three-chip system.

In a case where the optical engine 200 is the three-chip system, the laser source 100 simultaneously outputs the beams of three primary colors, so as to continuously emit the white beams.

It will be noted that, according to a projection architecture, the optical modulators (or the light valves) may include many kinds, such as a liquid crystal on silicon (LCOS) projection architecture, a liquid crystal display (LCD) projection architecture or a digital micromirror device (DMD) projection architecture. Since the optical engine 200 shown in FIG. 6 applies a digital light processing (DLP) projection architecture in some embodiments of the present disclosure, the optical modulators (or the light valves) in some embodiments of the present disclosure are digital micromirror devices (DMD) 240.

Figure 7:
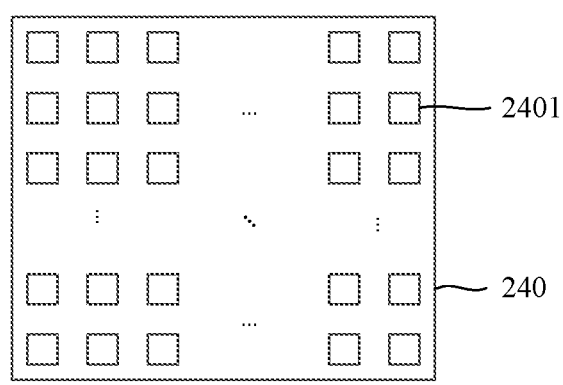
FIG. 7 is a diagram showing an arrangement of micromirrors in a digital micromirror device, in accordance with some embodiments.
Figure 8:
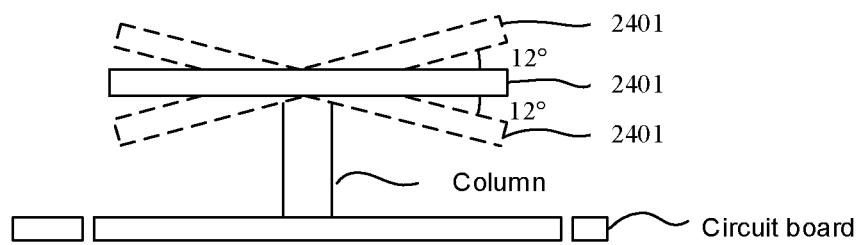
FIG. 8 is a diagram showing a swing position of a micromirror in the digital micromirror device shown in FIG. 7.

As shown in FIG. 7, the digital micromirror device 240 includes thousands of micromirrors 2401 that may be individually driven to rotate. These micromirrors 2401 are arranged in an array, and each micromirror 2401 corresponds to one pixel in the image to be displayed. As shown in FIG. 8, in the DLP projection architecture, each micromirror 2401 is equivalent to a digital switch. The micromirror may swing within a range of plus or minus 12 degrees (i.e., ±12°) or a range of plus or minus 17 degrees (i.e., ±17°) under an action of an external electric field.

Figure 9:
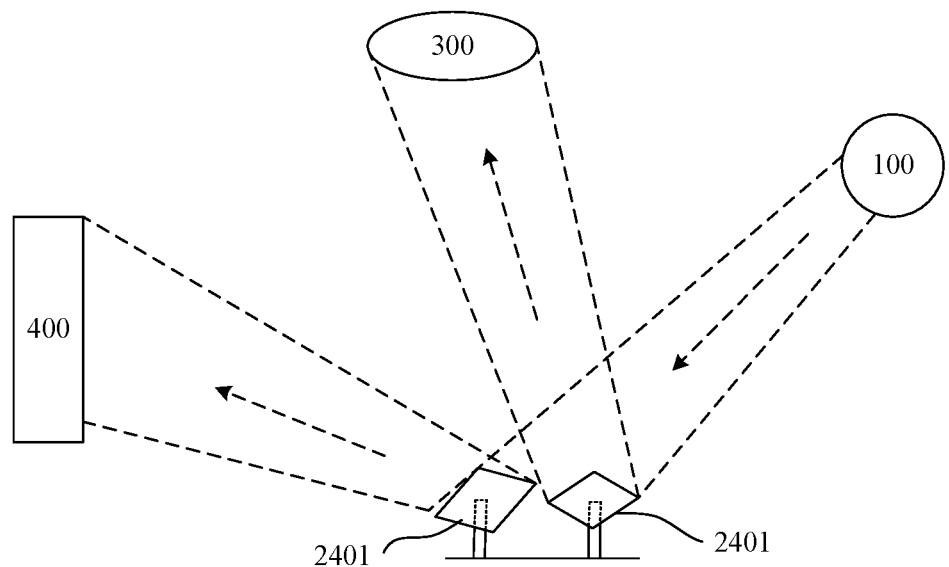
FIG. 9 is a schematic diagram showing operation of micromirrors, in accordance with some embodiments.

As shown in FIG. 9, a laser beam reflected by the micromirror 2401 at a negative deflection angle is referred to as an OFF laser beam, and the OFF laser beam is an ineffective laser beam, and which usually irradiates on the housing 11 of the projection host 10 and the housing of the optical engine 200, or is absorbed by a laser absorption unit 400. A laser beam reflected by the micromirror 2401 at a positive deflection angle is referred to as an ON laser beam. The ON laser beam is an effective beam reflected by the micromirror 2401 on a surface of the DMD 240 when it receives irradiation of the illumination beams, and the ON laser beam enters the projection lens 300 for projection imaging. An ON state of the micromirror 2401 is a state that the micromirror 2401 is in and may be maintained when the illumination beams emitted by the laser source 100 may enter the projection lens 300 after being reflected by the micromirror 2401. That is, the micromirror 2401 is in a state of the positive deflection angle. An OFF state of the micromirror 2401 is a state that the micromirror 2401 is in and may be maintained when the illumination beams emitted by the laser source 100 does not enter the projection lens 300 after being reflected by the micromirror 2401. That is, the micromirror 2401 is in a state of the negative deflection angle.

For example, for a micromirror 2401 with a deflection angle of ±12°, a state at +12° is the ON state, and a state at −12° is the OFF state. For a deflection angle between −12° and +12°, it is not used in practice, and actual operation states of the micromirror 2401 are only the ON state and the OFF state. For a micromirror 2401 with a deflection angle of ±17°, a state at +17° is the ON state, and a state at −17° is the OFF state. The image signals are converted into digital codes such as 0 and 1 after being processed, and these digital codes may drive the micromirrors 2401 to swing.

In a display cycle of a frame of an image, some or all of the micromirrors 2401 are switched once between the ON state and the OFF state, so that gray scales of pixels in the frame image are achieved according to durations of the micromirrors 2401 in the ON state and the OFF state. For example, in a case where the pixels have 256 gray scales from 0 to 255, micromirrors 2401 corresponding to a gray scale 0 are each in the OFF state in an entire display cycle of the frame of the image, micromirrors 2401 corresponding to a gray scale 255 are each in the ON state in the entire display cycle of the frame of the image, and micromirrors 2401 corresponding to a gray scale 127 are each in the ON state for a half of time and in the OFF state for another half of time in the display cycle of the frame of the image. Therefore, by controlling a state that each micromirror 2401 in the DMD 240 is in and a duration of each state in the display cycle of the frame of the image through the image signals, luminance (the gray scale) of a pixel corresponding to the micromirror 2401 may be controlled, thereby achieving a purpose of modulating the illumination beams projected onto the DMD 240.

Referring to FIGS. 5 and 6, the light pipe 210, the lens assembly 220 and the reflector 230 at a front end of the DMD 240 form an illumination path, and the illumination beams emitted by the laser source 100 pass through the illumination path to have a size and an incident angle which are met the requirements of the DMD 240.

As shown in FIG. 5, the projection lens 300 includes a combination of a plurality of lenses, which are usually divided by groups, and are divided into a three-segment combination including a front group, a middle group and a rear group, or a two-segment combination including a front group and a rear group. The front group is a lens group proximate to a laser-exit side of the projection host 10 (i.e., a side of the projection lens 300 away from the optical engine 200 along the N direction), and the rear group is a lens group proximate to a laser-exit side of the optical engine 200 (i.e., a side of the projection lens 300 proximate to the optical engine 200 along the N direction). The projection lens 300 may be a zoom projection lens, or a prime adjustable-focus projection lens, or a prime projection lens.

In some embodiments, the laser projection apparatus 1 is an ultra-short-focus laser projection apparatus, and the projection lens 300 is an ultra-short-focus projection lens. For example, as shown in FIG. 1, compared with a laser-exit manner in which optical axes of the projection beams are located in a perpendicular bisector of a projection image in a long-focus laser projection apparatus, the projection beams in an ultra-short-focus laser projection apparatus exit in an obliquely upward direction (referring to the direction A shown in FIG. 1) after entering the projection lens 300, and the ultra-short-focus projection lens usually has an offset within a range of 120% to 150% with respect to the projection image. This projection manner has a small projection ratio (i.e., a ratio of a distance between the projection host 10 and the projection screen 20 to a dimension of a diagonal of the projection image). For example, the projection ratio is about 0.2 or less. The distance between the projection host 10 and the projection screen 20 is small, so that it is possible to achieve a large-sized projection display with a small projection ratio.

For ease of description, some embodiments of the present disclosure are mainly described by taking an example in which the laser source 100 sequentially outputs the beams of three primary colors, the projection host 10 adopts the DLP projection architecture, the optical modulator in the optical engine 200 is the digital micromirror device 240, and the projection lens 300 is the ultra-short-focus projection lens, however, this should not be construed as a limitation of the present disclosure.

The laser source 100 according to some embodiments of the present disclosure will be described in detail below.

Figure 10:
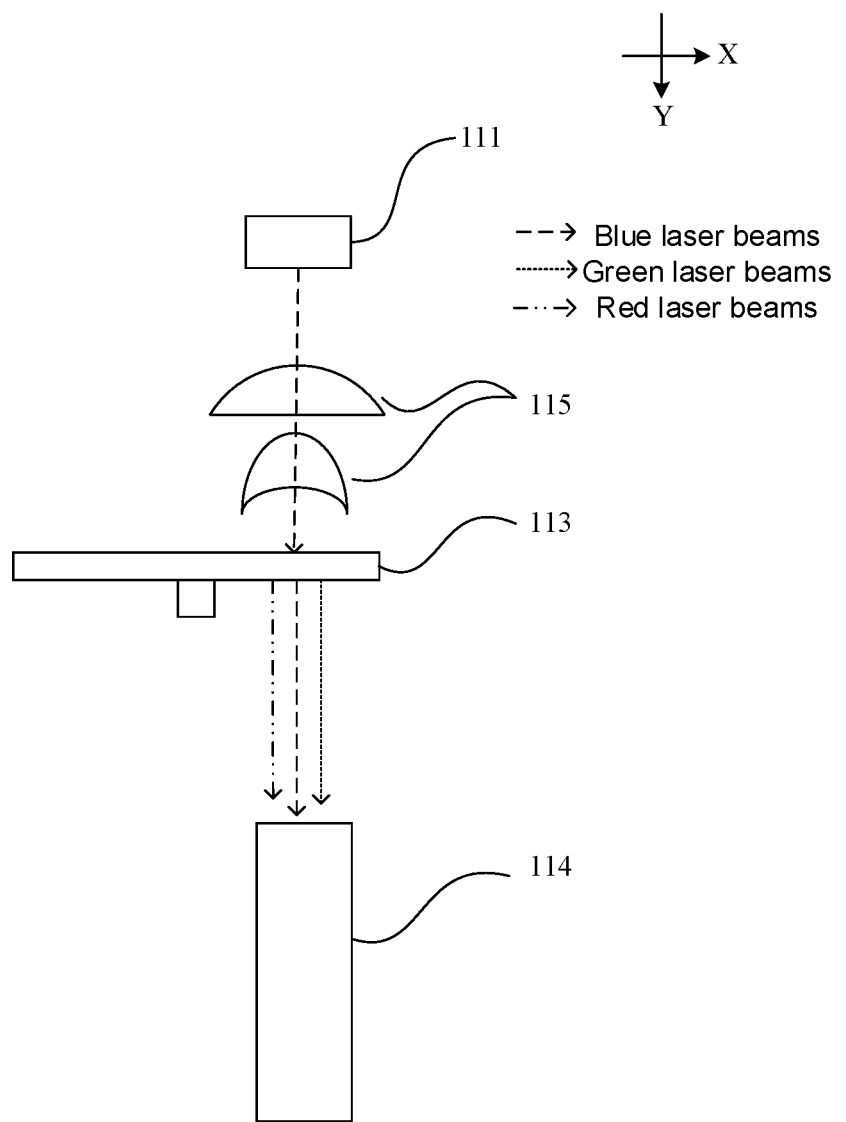
FIG. 10 is a diagram showing a beam path of a laser source, in accordance with some embodiments.

In some embodiments, as shown in FIG. 10, the laser source 100 includes a laser 111, a converging lens group 115, a phosphor wheel 113 and a light collection member 114. The phosphor wheel 113 is a transmissive phosphor wheel and includes a fluorescence region and a transmission region. The fluorescence region is configured to emit a fluorescent beam under irradiation of a laser beam and transmit the fluorescent beam, and the transmission region is configured to transmit the laser beam.

Laser beams emitted by the laser 111 are incident on the phosphor wheel 113 after converged by the converging lens group 115. With rotation of the phosphor wheel 113, in a case where the laser beams emitted by the laser 111 are incident on the fluorescence region of the phosphor wheel 113, the laser beams may excite fluorescent materials in the fluorescence region to emit fluorescent beams, and the fluorescent beams pass through the phosphor wheel 113 and exit from a back surface of the phosphor wheel 113 into the light collection member 114. In a case where the laser beams emitted by the laser 111 are incident on the transmission region of the phosphor wheel 113, the laser beams pass through the transmission region and exit from the back surface of the phosphor wheel 113 into the light collection member 114. In an optical path architecture shown in FIG. 10, light travels substantially in one direction, and a plurality of optical components in the optical path are substantially arranged in a line, resulting in a long length in one direction or in one dimension.

Figure 11:
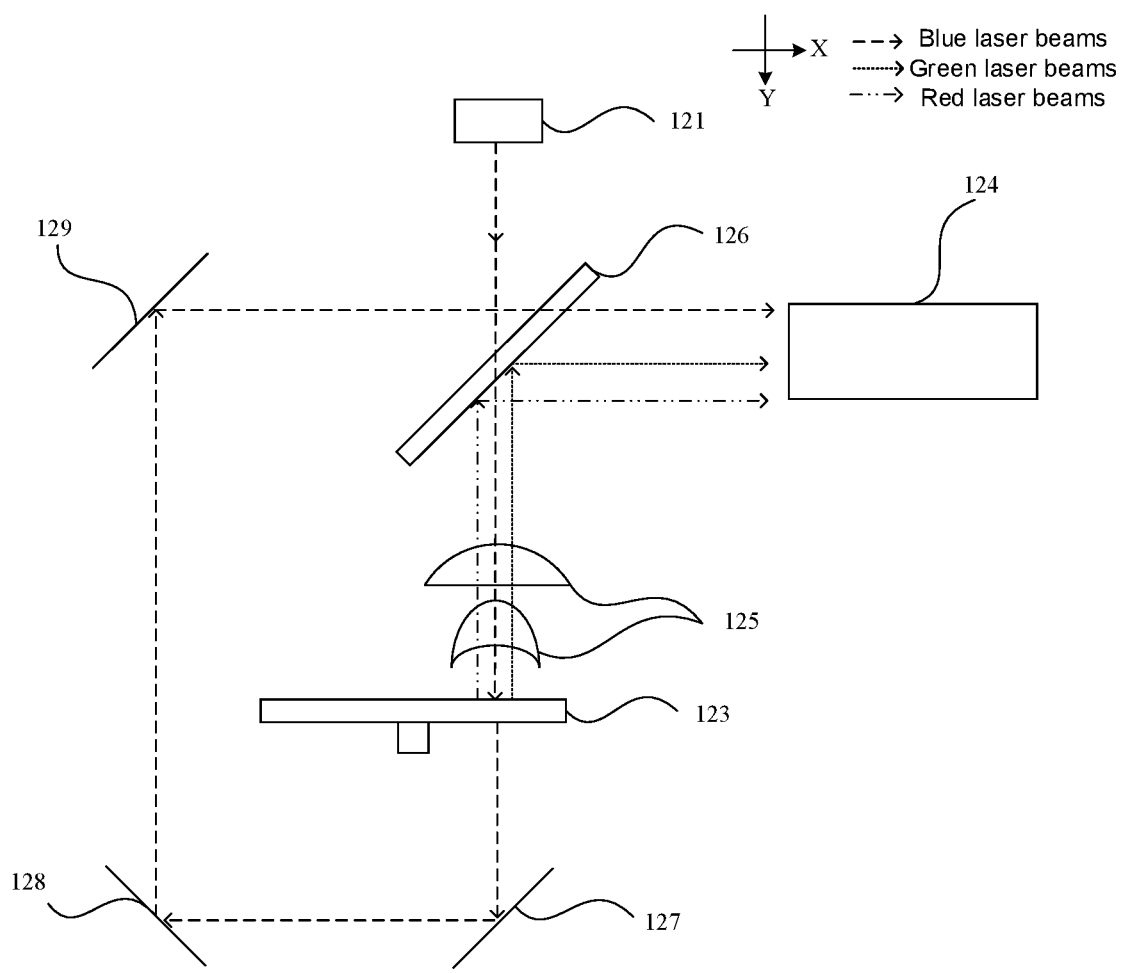
FIG. 11 is a diagram showing a beam path of another laser source, in accordance with some embodiments.

In other embodiments, as shown in FIG. 11, the laser source 100 includes a laser 121, a dichroic mirror 126, a converging lens group 125, a phosphor wheel 123, a light collection member 124 and a relay loop system. The relay loop system includes a first reflector 127, a second reflector 128 and a third reflector 129. The phosphor wheel 123 is a reflective phosphor wheel and includes a fluorescence region and a transmission region. The fluorescence region is configured to emit a fluorescent beam under irradiation of a laser beam and reflect the fluorescent beam, and the transmission region is configured to transmit the laser beam. The dichroic mirror 126 is configured to transmit the laser beam and reflect the fluorescent beam.

Laser beams emitted by the laser 121 pass through the dichroic mirror 126, and are incident on the phosphor wheel 123 after converged by the converging lens group 125. With rotation of the phosphor wheel 123, in a case where the laser beams emitted by the laser 121 are incident on the fluorescence region of the phosphor wheel 123, the laser beams may excite fluorescent materials in the fluorescence region to emit fluorescent beams. The fluorescent beams are reflected by the phosphor wheel 123 and run to the dichroic mirror 126, and further reflected by the dichroic mirror 126 and run to the light collection member 124. In a case where the laser beams emitted by the laser 121 are incident on the transmission region of the phosphor wheel 123, the laser beams may pass through the transmission region and run to the first reflector 127, and then are reflected sequentially by the first reflector 127, the second reflector 128, and the third reflector 129 and run to the dichroic mirror 126, and finally pass through the dichroic mirror 126 and run to the light collection member 124. In an optical path architecture shown in FIG. 11, due to an arrangement of the relay loop, the number of lenses in the optical system is large, and they need to occupy a certain space, resulting in a large volume of the laser source.

In yet other embodiments, as shown in FIGS. 12A, 12B, 13A, 15A and 16A, the laser source 100 includes at least one light-emitting assembly 101, a phosphor wheel 103, a converging lens group 105 and a combining component 102. The at least one light-emitting assembly 101 is configured to emit a first laser beam S1 and a second laser beam S2.

A number of the at least one light-emitting assembly 101 is not limited in the present disclosure, and it may be one, two or more. For example, the number of the at least one light-emitting assembly 101 is one, and on this basis, the first laser beam S1 and the second laser beam S2 are two parts of a laser beam and are emitted by different light-emitting regions of a light-emitting assembly 101. For another example, the number of the at least one light-emitting assembly 101 is two, and on this basis, the first laser beam S1 and the second laser beam S2 are two independent laser beams and emitted by two light-emitting assemblies 101 respectively. In a case where the number of the at least one light-emitting assembly 101 is three or more, these light-emitting assemblies 101 may emit three, four or more laser beams; and the first laser beam S1 and the second laser beam S2 are any two of these laser beams.

Figure 12A:
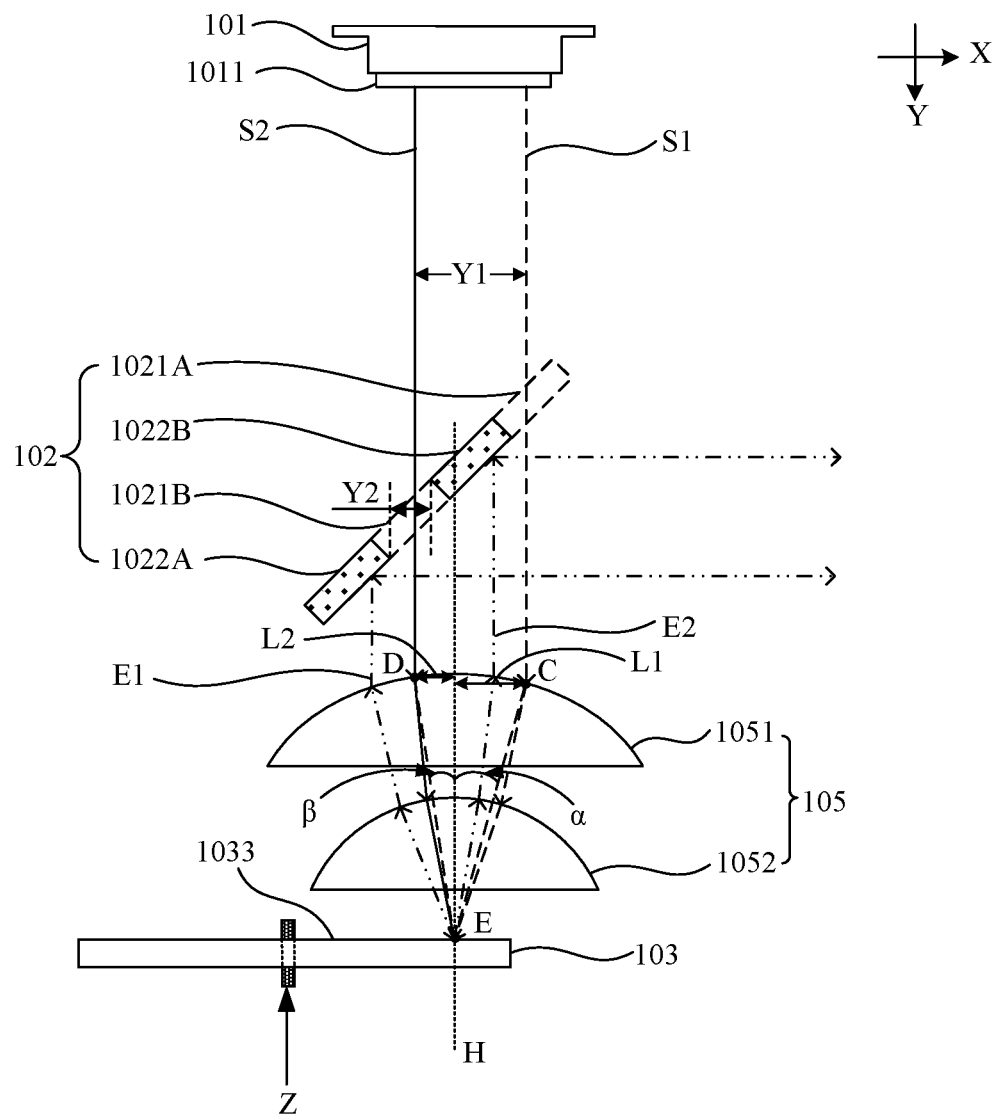
FIG. 12A is a diagram showing a beam path of yet another laser source, in accordance with some embodiments.
Figure 12B:
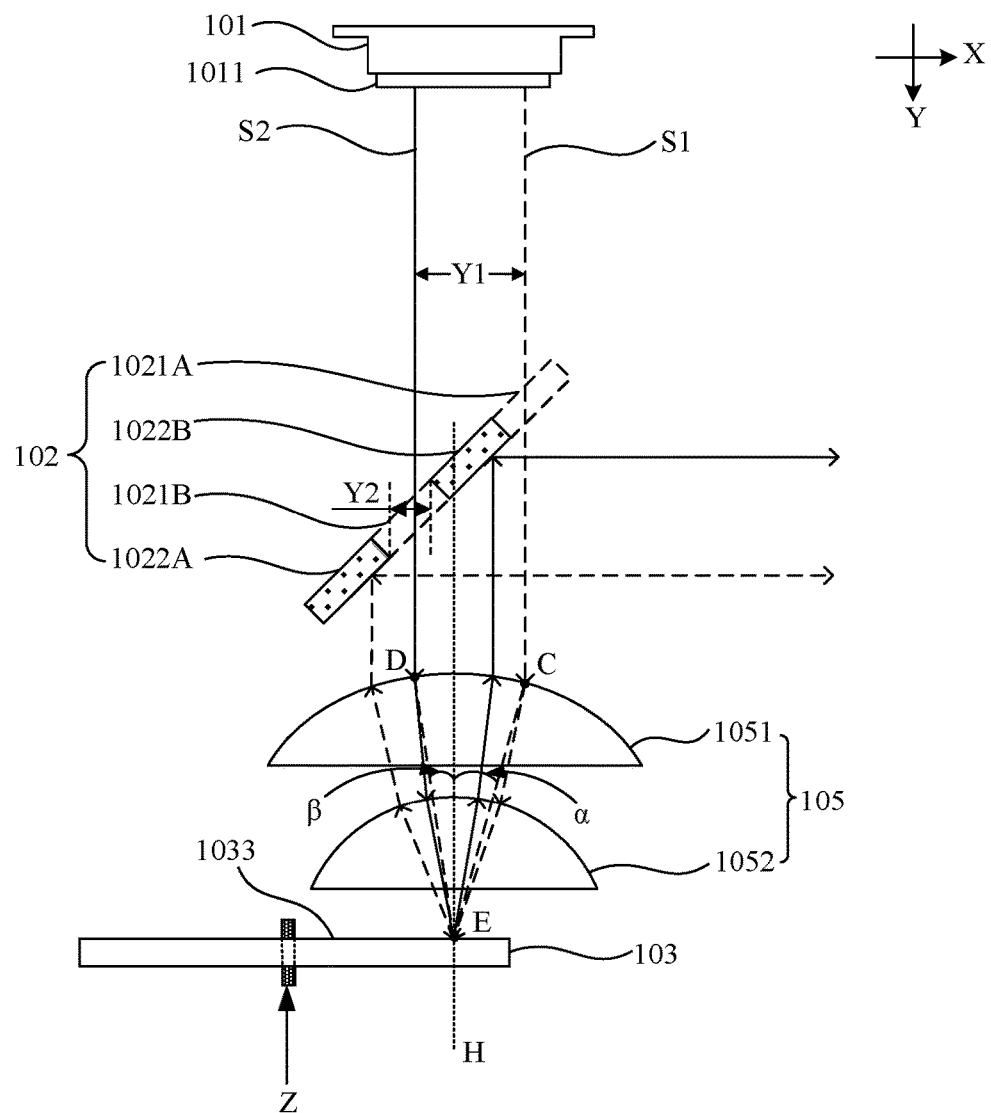
FIG. 12B is a diagram showing a beam path of yet another laser source, in accordance with some embodiments.
Figure 12C:
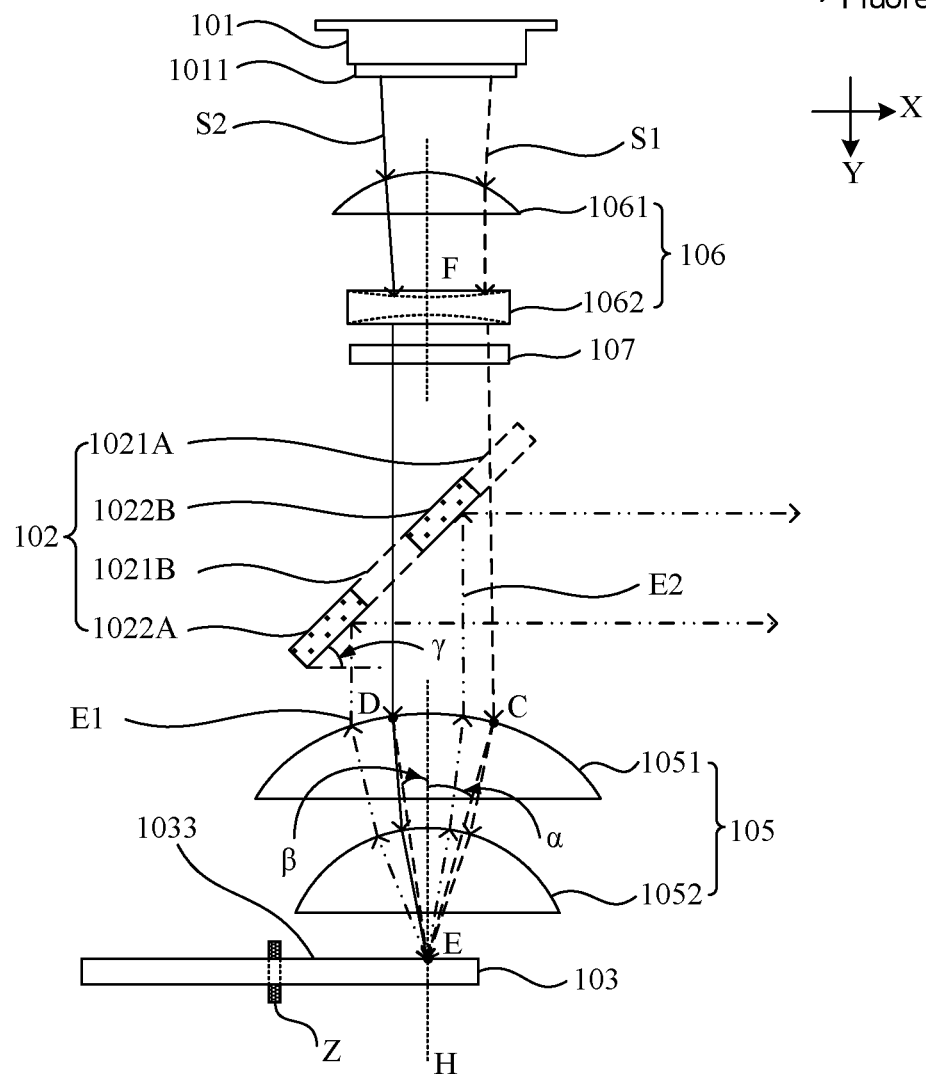
FIG. 12C is a diagram showing a beam path of yet another laser source, in accordance with some embodiments.

As shown in FIGS. 12A and 12B, both the first laser beam S1 and the second laser beam S2 are emitted by one light-emitting assembly 101, and the first laser beam S1 and the second laser beam S2 are two laser beams whose beam paths do not overlap. After being emitted by the light-emitting assembly 101 and before entering the converging lens group 105, the first laser beam S1 and the second laser beam S2 are spaced apart by a first predetermined distance Y1. The first predetermined distance Y1 is greater than at least one of a width of the first laser beam S1 or a width of the second laser beam S2, so that the beam path of the first laser beam S1 does not overlap with the beam path of the second laser beam S2, and the first laser beam S1 and the second laser beam S2 are incident on different positions of the optical elements in the beam paths.

In some embodiments of the present disclosure, the laser beams are set to two laser beams (e.g., the first laser beam S1 and the second laser beam S2), and the two laser beams irradiate on different positions of a same optical element (e.g., the converging lens group 105) in a beam path of the laser beams. As a result, a problem of aging or performance degradation caused by localized exposure of the optical element to high-energy beams over a long period of time may be improved, while energy density of the laser beams is increased to increase luminous power of the fluorescent beams.

Figure 20A:
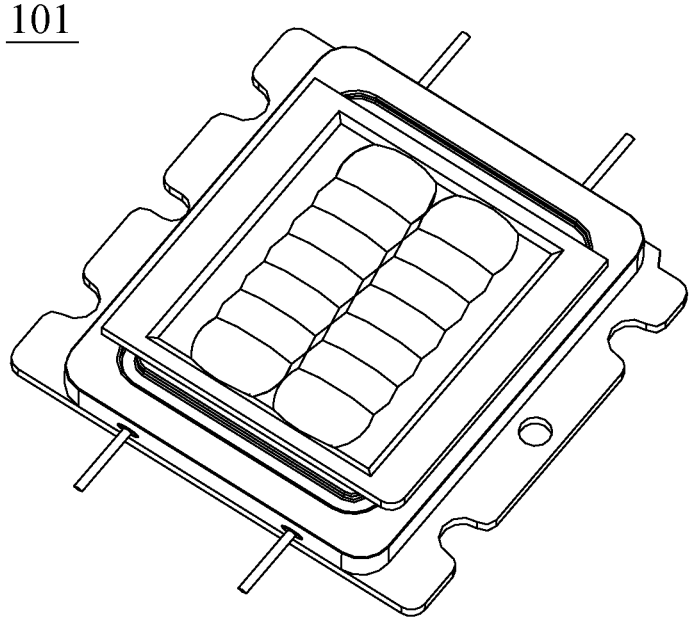
FIG. 20A is a diagram showing a structure of a light-emitting assembly, in accordance with some embodiments.
Figure 20B:
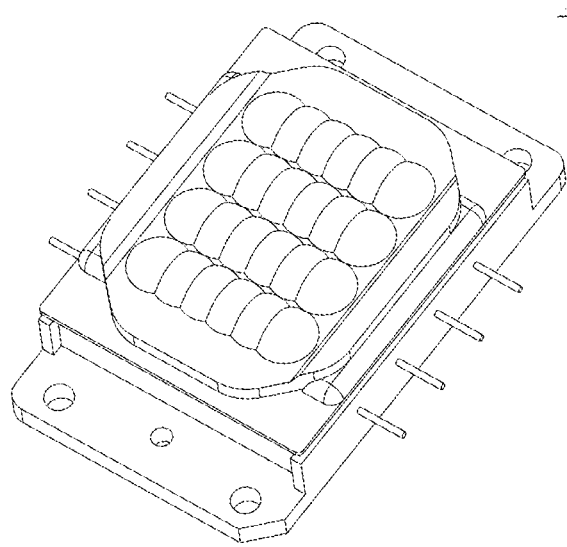
FIG. 20B is a diagram showing a structure of another light-emitting assembly, in accordance with some embodiments.

In some embodiments, the light-emitting assembly 101 may be a multi-chip laser diode (MCL) device. The MCL device may include a plurality of light-emitting chips arranged in an array and packaged in a same case. Each light-emitting chip may emit a laser beam independently. For example, FIG. 20A shows an MCL device including two rows and seven columns of light-emitting chips, and FIG. 20B shows an MCL device including four rows and six columns of light-emitting chips.

The first laser beam S1 and the second laser beam S2 are respectively emitted from different light-emitting regions of the laser device. For example, the first laser beam S1 and the second laser beam S2 are respectively emitted by different light-emitting chips in the laser device.

In some embodiments, colors of the first laser beam S1 and the second laser beam S2 are the same. For example, both the first laser beam S1 and the second laser beam S2 are blue. On this basis, the first laser beam S1 and the second laser beam S2 are emitted by the laser device at the same time. In a case where the plurality of light-emitting chips of the laser device emit laser beams simultaneously, the laser beams emitted by the laser device are thick, and luminance of the laser beams is high. Therefore, luminance of the image obtained when the laser projection apparatus 1 performs a projection is high, which improves the projection effect of the laser projection apparatus 1.

An example in which colors of the first laser beam S1 and the second laser beam S2 are the same and both are blue is taken. In some embodiments, a wavelength range of the first laser beam S1 overlaps with a wavelength range of the second laser beam S2. For example, the wavelength ranges of the first laser beam S1 and the second laser beam S2 are both within a range of 400 nm to 450 nm inclusive. Alternatively, the wavelength range of the first laser beam S1 is within a range of 400 nm to 430 nm inclusive, and the wavelength range of the second laser beam S2 is within a range of 420 nm to 450 nm inclusive. In some embodiments, dominant wavelengths of the first laser beam S1 and the second laser beam S2 are different.

It will be noted that, a beam of light is obtained by compounding light of multiple wavelengths in one wavelength range, the beam of light perceived by the human eyes is a result of the combined action of light of each wavelength. As a result, the human eyes perceive the beam of light which is corresponding to a light of a single wavelength, and the wavelength is the dominant wavelength of the beam of light.

In some other embodiments, colors of the first laser beam S1 and the second laser beam S2 are different. For example, the first laser beam S1 is blue and the second laser beam S2 is red. On this basis, the first laser beam S1 and the second laser beam S2 are emitted by the laser device sequentially.

In a case where the plurality of light-emitting chips of the laser device emit the laser beams at different times, since only some of the light-emitting chips in the laser device emit the laser beams simultaneously, the emitted laser beams are thin, so that it may ensure that the laser beams all exit through the beam outlet of the laser source 100, avoiding waste of light. In addition, since there is no need for the light-emitting chips in the laser device to emit laser beams continuously, a pulse current may be used to supply power to the light-emitting chips, and energy of the pulse current is high, so that the light-emitting chips may emit laser beams with high luminance. Moreover, there is no need for the light-emitting chips to emit laser beams continuously, which improves a service life of the light-emitting chips in the laser device.

The following is mainly described by taking an example in which both the first laser beam S1 and the second laser beam S2 are simultaneously emitted by the one light-emitting assembly 101, and colors of the first laser beam S1 and the second laser beam S2 are the same.

Figure 14A:
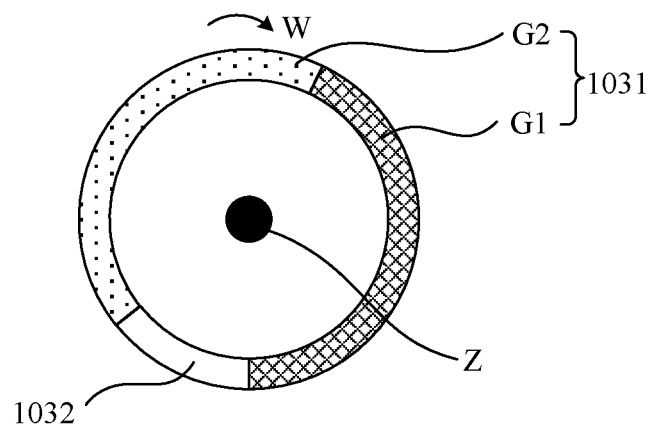
FIG. 14A is a diagram showing a structure of a phosphor wheel, in accordance with some embodiments.
Figure 14B:
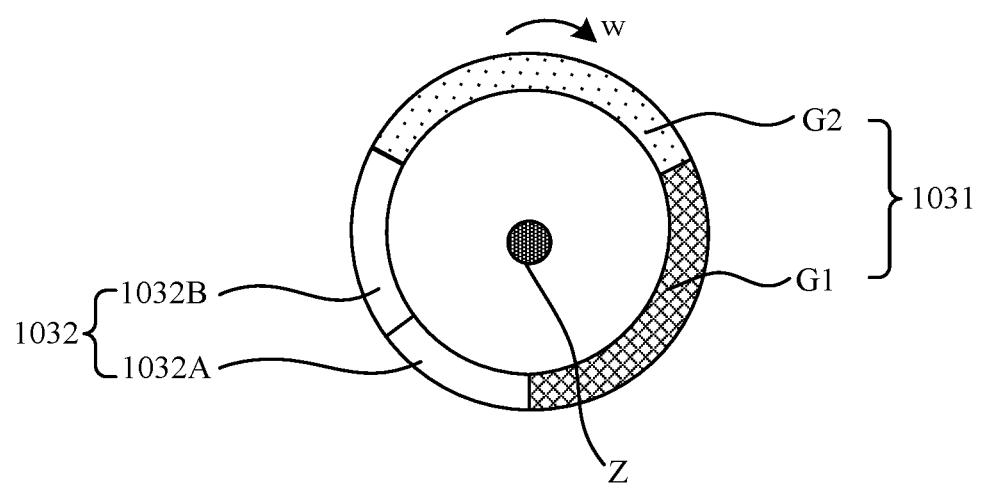
FIG. 14B is a diagram showing a structure of another phosphor wheel, in accordance with some embodiments.
Figure 15A:
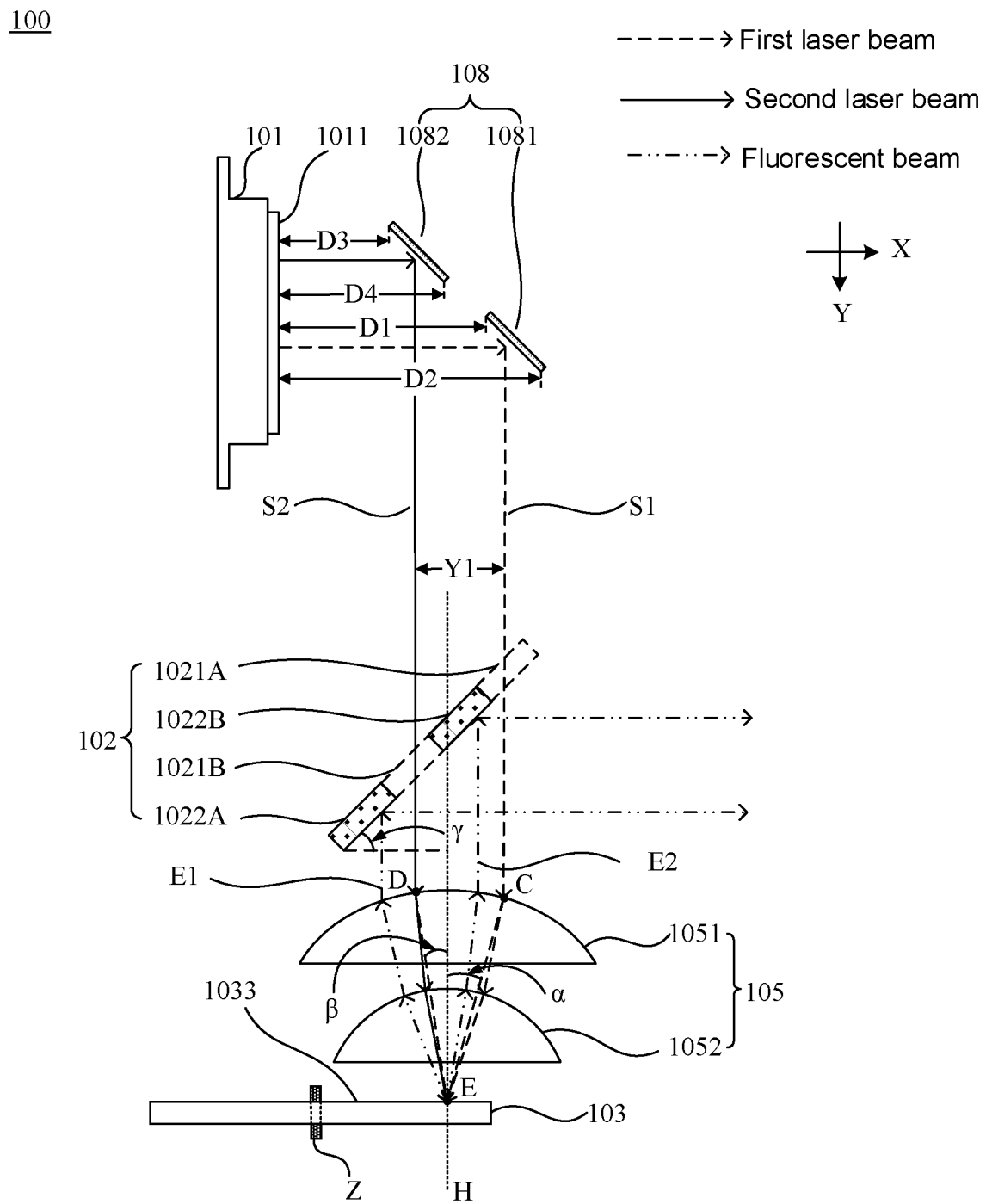
FIG. 15A is a diagram showing a beam path of yet another laser source, in accordance with some embodiments.
Figure 15B:
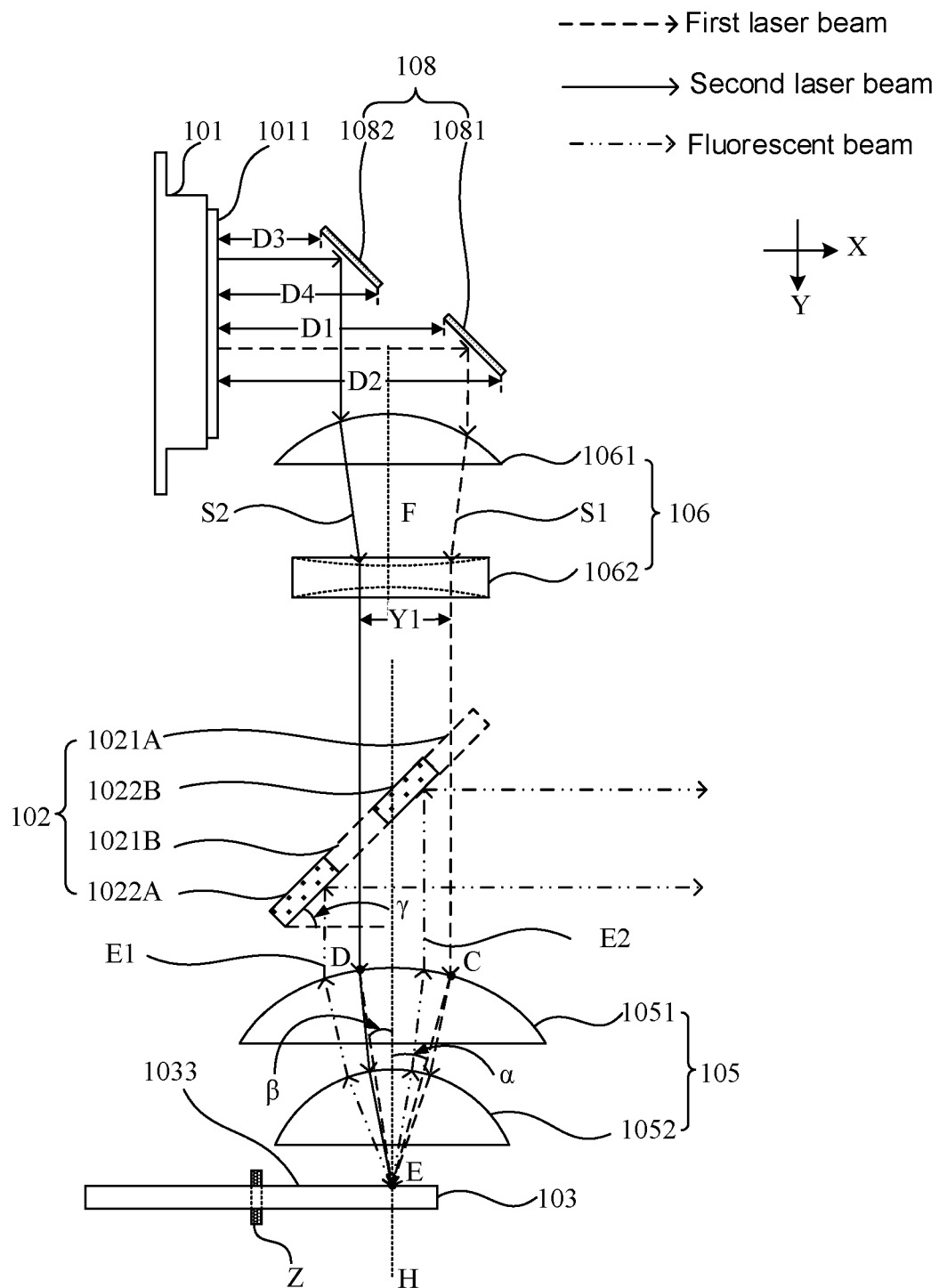
FIG. 15B is a diagram showing a beam path of yet another laser source, in accordance with some embodiments.

As shown in FIGS. 14A and 14B, the phosphor wheel 103 includes a fluorescence-exciting region 1031 and a laser-reflecting region 1032, and the phosphor wheel 103 does not include the laser-transmitting region. The fluorescence-exciting region 1031 of the phosphor wheel 103 is configured to emit fluorescent beams with colors different from colors of the laser beams under an excitation of the incident laser beams and reflect the fluorescent beams. The laser-reflecting region 1032 of the phosphor wheel 103 is configured to reflect the incident laser beams.

In some embodiments, the fluorescence-exciting region 1031 and the laser-reflecting region 1032 are both in a shape of a fan ring, so as to enclose a ring shape. The laser beams will not irradiate on a rest of the phosphor wheel 103 except for the fluorescence-exciting region 1031 and the laser reflection-reflecting 1032, and thus the rest of the phosphor wheel 103 may reflect or transmit the laser beams, which is not limited in the present disclosure. In some embodiments, both the fluorescence-exciting region 1031 and the laser-reflecting region 1032 are fan-shaped, so as to enclose a disk shape. A rotating shaft Z of the phosphor wheel 103 may pass through a center of the phosphor wheel 103 and be perpendicular to a surface of the phosphor wheel 103, and the phosphor wheel 103 may rotate around the rotating shaft Z in a W direction or an opposite direction of the W direction.

In some embodiments, the fluorescence-exciting region 1031 may emit fluorescent beams in various directions under the excitation of the laser beams, and a light-emitting angle of the fluorescence-exciting region 1031 may be within a range of 0° to 180° inclusive (e.g., 30°, 45°, 60°, 90°, 120°, 150° or 180°).

The fluorescence-exciting region 1031 may be provided with at least one of green fluorescent material, red fluorescent material or yellow fluorescent material. The fluorescent materials may be phosphor powder. The fluorescent material of each color may emit fluorescent beams of a corresponding color via the excitation of the laser beams. For example, the green fluorescent material may emit green fluorescent beams via the excitation of the laser beams, the red fluorescent material may emit red fluorescent beams via the excitation of the laser beams, and the yellow fluorescent material may emit yellow fluorescent beams via the excitation of the laser beams.

In some embodiments, the fluorescence-exciting region 1031 includes sub-fluorescence-exciting regions, and each sub-fluorescence-exciting region is provided with a fluorescent material of one color. In a case where the fluorescence-exciting region 1031 includes a plurality of sub-fluorescence-exciting regions, the plurality of sub-fluorescence-exciting regions and the laser-reflecting region 1032 may be arranged circumferentially around the rotating shaft Z.

For example, as shown in FIGS. 14A and 14B, the fluorescence-exciting region 1031 includes two sub-fluorescence-exciting regions, that is, a first sub-fluorescence-exciting region G1 and a second sub-fluorescence-exciting region G2. The first sub-fluorescence-exciting region G1, the second sub-fluorescence-exciting region G2 and the laser-reflecting region 1032 are arranged circumferentially around the rotating shaft Z.

In some embodiments, the two sub-fluorescence-exciting regions are provided with green fluorescent material and red fluorescent material respectively. Alternatively, the two sub-fluorescence-exciting regions are provided with green fluorescent material and yellow fluorescent material respectively. Alternatively, the two sub-fluorescence-exciting regions are provided with green fluorescent material and orange fluorescent material respectively.

In some embodiments, an area of each sub-fluorescence-exciting region (G1 or G2) is same, and the area of each sub-fluorescence-exciting region (G1 or G2) is not equal to an area of the laser-reflecting region 1032.

The laser beams incident on the laser-reflecting region 1032 of the phosphor wheel 103 are the blue laser beams, and the laser-reflecting region 1032 may reflect the blue laser beams. The first sub-fluorescence-exciting region G1 is provided with the red fluorescent material, so that the first sub-fluorescence-exciting region G1 may emit the red fluorescent beams due to the excitation of the blue laser beams. The second sub-fluorescence-exciting region G2 is provided with the green fluorescent material, so that the second sub-fluorescence-exciting region G2 may emit the green fluorescent beams due to the excitation of the blue laser beams.

The white beams may be obtained by mixing the blue laser beams, the red fluorescent beams and the green fluorescent beams in a ratio of about 1:3:3, so it is necessary to ensure that the ratio of the blue laser beams, the red fluorescent beams and the green fluorescent beams emitted from the phosphor wheel 103 is about 1:3:3.

In some embodiments, as shown in FIG. 14A, on the premise of keeping a rotational speed of the phosphor wheel 103 to be constant, if the area of the laser-reflecting area 1032 of the phosphor wheel 103 and the areas of each sub-fluorescence-exciting area are distributed in a ratio of 1:3:3, the blue laser beams, the red fluorescent beams and the green fluorescent beams emitted from the phosphor wheel 103 are mixed to obtain the white beams.

In some embodiments, the area of each sub-fluorescence-exciting region (G1 or G2) is different, and the area of at least one sub-fluorescence-exciting region (G1 or G2) is equal to the area of the laser-reflecting region 1032.

For example, if the white beams can be obtained by mixing the blue laser beams, the red fluorescent beams and the green fluorescent beams in a ratio of 1:1:2, the area of the laser-reflecting region 1032 of the phosphor wheel 103 is equal to the area of the first sub-fluorescence-exciting region G1, and the area of the first sub-fluorescence-exciting region G1 is half of the area of the second sub-fluorescence-exciting region G2.

As shown in FIGS. 14A and 14B, the phosphor wheel 103 may rotate around the rotating shaft Z. As the phosphor wheel 103 rotates, the fluorescence-exiting region 1031 and the laser-reflecting region 1032 are alternately irradiated by the laser beams (e.g., the first laser beam S1 and the second laser beam S2), different fluorescent materials will sequentially and repeatedly generate fluorescent beams of different colors according to a rotation sequence.

In some embodiments, the light-emitting assembly 101 emits the first laser beam S1 and the second laser beam S2 sequentially, and colors of the first laser beam S1 and the second laser beam S2 are different.

For example, the first laser beam S1 is a blue laser beam, and the second laser beam S2 is a red laser beam. The blue laser beam may be used as both an excitation light source and a light source of a blue primary color. The red laser beam is used as a light source of a red primary color. In this case, as shown in FIG. 14B, the laser-reflecting region 1032 includes a blue laser-reflecting region 1032A and a red laser-reflecting region 1032B. The first sub-fluorescence-exciting region G1 is a green fluorescence-exciting region, and the second sub-fluorescence-exciting region G2 is a yellow fluorescence-exciting region.

The blue laser-reflecting region 1032A is configured to reflect blue laser beams, and the red laser-reflecting region 1032B is configured to reflect red laser beams. The first sub-fluorescence-exciting region G1 is configured to emit green fluorescent beams under irradiation of blue laser beams, and reflect the green fluorescent beams. The second sub-fluorescence-exciting region G2 is configured to emit yellow fluorescent beams under irradiation of blue laser beams, and reflect the yellow fluorescent beams.

With rotation of the phosphor wheel 103, in a case where the light-emitting assembly 101 emits the first laser beam S1 and the first laser beam S1 is incident on the blue laser-reflecting region 1032A, the first laser beam S1 is reflected by the blue laser-reflecting region 1032A. In a case where the first laser beam S1 is incident on the first sub-fluorescence-exciting region G1, the first sub-fluorescence-exciting region G1 is excited to generate green fluorescent beams, and reflects the green fluorescent beams. In a case where the first laser beam S1 is incident on the second sub-fluorescence-exciting region G2, the second sub-fluorescence-exciting region G2 is excited to generate yellow fluorescent beams, and reflects the yellow fluorescent beams. In a case where the light-emitting assembly 101 emits the second laser beam S2, the second laser beam S2 is incident on the red laser-reflecting region 1032B, and is reflected by the red laser-reflecting region 1032B.

Thus, the blue laser beams, the green fluorescent beams, the yellow fluorescent beams and the red laser beams are sequentially emitted to the combining component 102, and the light beams of four primary colors are all reflected by the combining component 102 to the beam outlet of the laser source 100, forming sequential illumination beams.

In some embodiments, the red laser-reflecting region 1032B may further be provided with a scattering material layer, and the scattering material layer may reflect and scatter the red laser beams, thereby improving speckle dissipation effect on the red laser beams.

In some embodiments, the phosphor wheel 103 includes a second substrate (i.e., a substrate). The second substrate may be a reflective substrate, and the laser-reflecting region 1032 of the phosphor wheel 103 may be a portion of the reflective substrate. For example, the reflective substrate is a metal substrate (e.g., an aluminum substrate), and a surface of a side of the metal substrate facing the laser beams has a mirror surface.

In some embodiments, the fluorescence-exciting region 1031 of the phosphor wheel 103 is located on the reflective substrate, and a surface of a side of the reflective substrate facing the laser beams is a reflective surface. For example, the reflective substrate is coated with the fluorescent material, so as to form the fluorescence-exciting region 1031, and a region on the reflective substrate that is not coated with the fluorescent material forms the laser-reflecting region 1032.

In some embodiments, the second substrate of the phosphor wheel 103 may also be a non-reflective substrate. For example, the second substrate is a ceramic substrate, and a reflective film layer may be disposed on the ceramic substrate. For example, fluorescent materials may be coated on different regions of a surface of the reflective film layer of the second substrate. A region coated with the fluorescent material on the reflective film layer forms the fluorescence-exciting region 1031 of the phosphor wheel 103. A region on the reflective film layer that is not coated with the fluorescent material forms the laser-reflecting region 1032 of the phosphor wheel 103.

As shown in FIGS. 12A, 12B, 13A, 15A and 16A, the combining component 102 is located between the light-emitting assembly 101 and the phosphor wheel 103. The combining component 102 is configured to transmit the laser beams emitted by the light-emitting assembly 101 and reflect the laser beams reflected by the phosphor wheel 103 or the fluorescent beams excited by the phosphor wheel 103. The combining component 102 has a first reflecting region 1022A, a second reflecting region 1022B, a first transmitting region 1021A and a second transmitting region 1021B. Moreover, light reflecting regions (i.e., the first reflecting region 1022A and the second reflecting region 1022B) and laser transmitting regions (i.e., the first transmitting region 1021A and the second transmitting region 1021B) of the combining component 102 are alternately arranged. The first reflecting region 1022A is located at an end of the combining component 102 proximate to the phosphor wheel 103. The first transmitting region 1021A is located at an end of the combining component 102 away from the phosphor wheel 103.

In some embodiments, as shown in FIGS. 12A to 12C and 15A to 15B, the combining component 102 is a groupware. The combining component 102 includes two reflectors arranged independently of each other. The two reflectors are located in the first reflecting region 1022A and the second reflecting region 1022B of the combining component 102 respectively. There is a gap between the two reflectors, and the gap forms the second transmitting region 1021B of the combining component 102. A side of the reflector away from the gap forms the first transmitting region 1021A. The reflector is a reflector for all wavelength ranges, which may reflect light of all colors. Alternatively, the reflector is a reflector for a plurality of specific wavelength ranges (e.g., a wavelength range of red light, a wavelength range of yellow light, a wavelength range of green light, or a wavelength range of blue light).

The second transmitting region 1021B is configured to allow one of the first laser beam S1 or the second laser beam S2 to pass through, and the first transmitting region 1021A is configured to allow the other of the first laser beam S1 or the second laser beam S2 to pass through. For example, the first laser beam S1 passes through the first transmitting region 1021A, and the second laser beam S2 passes through the second transmitting region 1021B. The first reflecting region 1022A and the second reflecting region 1022B are configured to reflect the laser beams reflected by the laser-reflecting region 1032 of the phosphor wheel 103 and the fluorescent beams excited by the fluorescence-exciting region 1031 of the phosphor wheel 103.

The reflector located in the first reflecting region 1022A and the reflector located in the second reflecting region 1022B are both disposed obliquely to a wheel surface of the phosphor wheel 103 (e.g., a laser receiving surface 1033 of the phosphor wheel 103), and oblique angles of the two reflectors are same. The two reflectors are spaced apart by a second predetermined distance Y2 to form the second transmitting region 1021B. Neither the first reflecting region 1022A nor the second reflecting region 1022B is located in the beam paths of the first laser beam S1 and the second laser beam S2, so as to prevent the reflectors in the first reflecting region 1022A and the second reflecting region 1022B from blocking the first laser beam S1 and the second laser beam S2.

For example, the reflector located in the first reflecting region 1022A and the reflector located in the second reflecting region 1022B are both disposed obliquely at 45° with respect to the laser receiving surface 1033 of the phosphor wheel 103. The second predetermined distance Y2 is greater than or equal to at least one of a width of the first laser beam S1 or a width of the second laser beam S2, and is less than or equal to a width of an orthogonal projection of any reflector on the laser receiving surface 1033 of the phosphor wheel 103. For example, the second predetermined distance Y2 is greater than or equal to 3 mm, and less than or equal to 12 mm (i.e., 3 mm≤Y2≤12 mm).

In some embodiments, as shown in FIGS. 13A to 13B and 16A to 16B, the combining component 102 may also be an integral member. The combining component 102 includes a first reflecting portion 1042A, a second reflecting portion 1042B, a first transmitting portion 1041A and a second transmitting portion 1041B. A plurality of reflecting portions and a plurality of transmitting portions are alternately arranged. The first reflecting portion 1042A is located in the first reflecting region 1022A, and the second reflecting portion 1042B is located in the second reflecting region 1022B. The first transmitting portion 1041A is located in the first transmitting region 1021A, and the second transmitting portion 1041B is located in the second transmitting region 1021B.

Transmitting portions of the combining component 102 are configured to transmit the laser beams emitted by the light-emitting assembly 101. For example, the first transmitting portion 1041A is configured to transmit the first laser beam S1, and the second transmitting portion 1041B is configured to transmit the second laser beam S2. Reflecting portions (i.e., the first reflecting portion 1042A and the second reflecting portion 1042B) of the combining component 102 are configured to reflect the laser beams reflected by the laser-reflecting region 1032 of the phosphor wheel 103 and the fluorescent beams excited by the fluorescence-exciting region 1031 of the phosphor wheel 103.

Since the fluorescent beams excited by the fluorescence-exciting region 1031 may exit in all directions, and light-emitting angles of the fluorescent beams are large, the fluorescent beams excited by the fluorescence-exciting region 1031 may not only exit to the light reflecting regions in the combining component 102, but also may exit to the laser transmitting regions in the combining component 102. In order to improve a utilization rate of the fluorescent beams, the transmitting portions of the combining component 102 may reflect light of different colors from the first laser beam S1 and the second laser beam S2. That is, the transmitting portions of the combining component 102 are further configured to reflect the fluorescent beams excited by the fluorescence-exciting region 1031 of the phosphor wheel 103.

For example, the combining component 102 is disposed obliquely at about 45° with respect to the laser receiving surface 1033 of the phosphor wheel 103. The first transmitting portion 1041A is located at the end of the combining component 102 away from the phosphor wheel 103, and the first reflecting portion 1042A is located at the end of the combining component 102 proximate to the phosphor wheel 103. The second transmitting portion 1041B and the second reflecting portion 1042B are located between the first reflecting portion 1042A and the first transmitting portion 1041A, and the transmitting portions and the reflecting portions of the combining component 102 are alternately arranged.

Considering a process and installation accuracy, an included angle between the combining component 102 and the laser receiving surface 1033 of the phosphor wheel 103 may have a tolerance of plus or minus 3° (i.e., ±3°). That is, an oblique angle γ between the combining component 102 and laser receiving surface 1033 of the phosphor wheel 103 is greater than or equal to 42°, and less than or equal to 48° (i.e., 42°≤γ≤48°).

It will be noted that, a number of the transmitting portions or the reflecting portions of the combining component 102 is greater than or equal to a number of the laser beams emitted by the light-emitting assembly 101. Some embodiments of the present disclosure are mainly described by taking an example in which the light-emitting assembly 101 emits two laser beams and the combining component 102 includes two transmitting portions and two reflecting portions, however, this should not be construed as a limitation of the present disclosure.

In some embodiments, the transmitting portions of the combining component 102 are configured to transmit the laser beams emitted by the light-emitting assembly 101 and reflect the fluorescent beams excited by the fluorescence-exciting region 1031 of the phosphor wheel 103. The reflecting portions of the combining component 102 are configured to reflect the laser beams reflected by the laser-reflecting region 1032 of the phosphor wheel 103 and the fluorescent beams excited by the fluorescence-exciting region 1031 of the phosphor wheel 103.

Figure 18A:
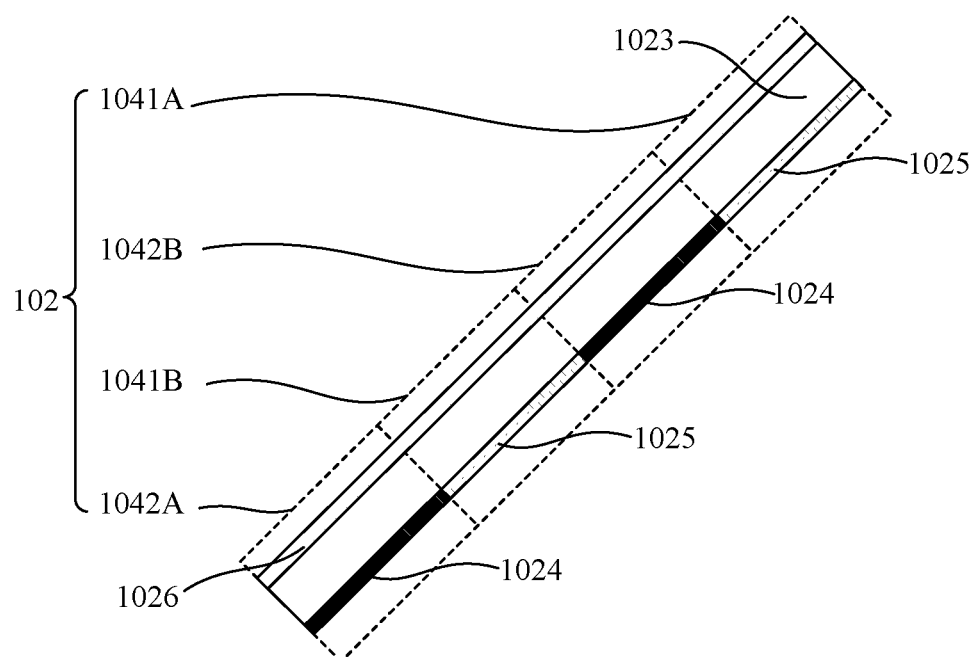
FIG. 18A is a diagram showing a structure of a combining component, in accordance with some embodiments.

On this basis, as shown in FIG. 18A, the combining component 102 includes a first substrate 1023, a coating film 1024 and a dichroic film 1025 that are disposed on the first substrate 1023 separately. The first substrate 1023 may be a transparent substrate.

The coating film 1024 is located on a surface of at least one side of parts of the first substrate 1023 which are corresponding to the reflecting portions. That is, the coating film 1024 is located at the parts of the first substrate 1023 corresponding to the reflecting portions and on a surface of a side of the first substrate 1023 proximate to the converging lens group 105. Alternatively, the coating film 1024 is located at the parts of the first substrate 1023 corresponding to the reflecting portions and on a surface of a side of the first substrate 1023 away from the converging lens group 105. The coating film 1024 may be a reflective film for all wavelength ranges. Alternatively, the coating film 1024 may be a reflective film for at least one of the wavelength range of red light, the wavelength range of green light, and the wavelength range of the blue light.

The dichroic film 1025 is located on a surface of at least one side of the parts of the first substrate 1023 which are corresponding to the transmitting portions. That is, the dichroic film 1025 is located at the parts of the first substrate 1023 corresponding to the transmitting portions and on a surface of a side of the first substrate 1023 proximate to the converging lens group 105. Alternatively, the dichroic film 1025 is located at the parts of the first substrate 1023 corresponding to the transmitting portions and on a surface of a side of the first substrate 1023 away from the converging lens group 105. The dichroic film 1025 is configured to transmit blue light and reflect at least one of red light, yellow light, or green light.

For example, if the fluorescent beams exiting from the fluorescence-exciting region 1031 of the phosphor wheel 103 to the combining component 102 include red light, since the dichroic film 1025 is provided on the surface of the first substrate 1023 corresponding to the transmitting portions, in a case where the fluorescent beams are incident on the transmitting portions, the fluorescent beams will be reflected by the dichroic film 1025 into the beam outlet of the laser source 100, thereby improving the utilization rate of the fluorescent beams.

Figure 18B:
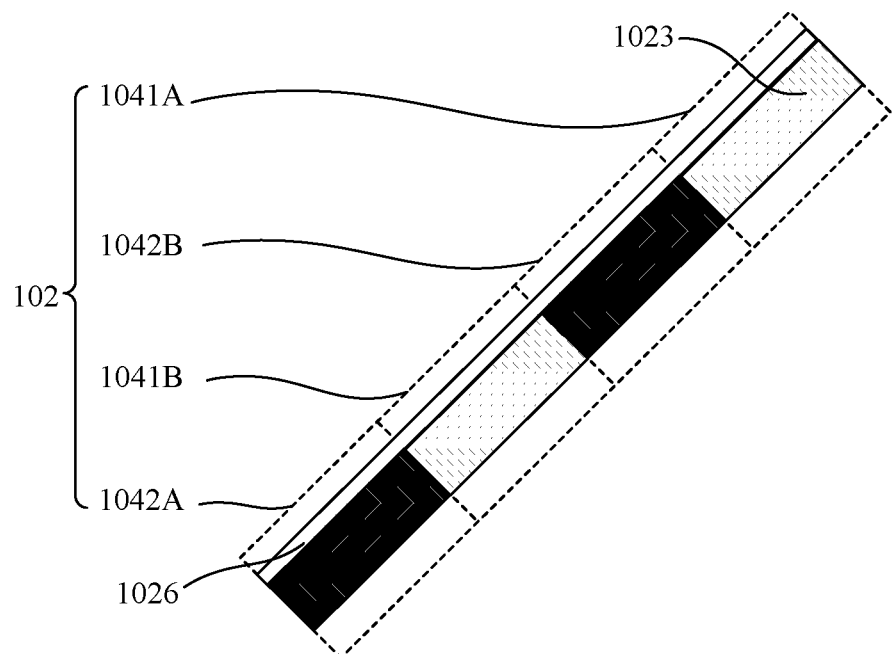
FIG. 18B is a diagram showing a structure of another combining component, in accordance with some embodiments.

In some embodiments, as shown in FIG. 18B, portions of the first substrate 1023 of the combining component 102 corresponding to the reflecting portions are reflective material members. Portions of the first substrate 1023 of the combining component 102 corresponding to the transmitting portions are material members with dichroism (e.g., a dichroic lens). The material member with dichroism is configured to transmit blue light and reflect at least one of red light, yellow light, and green light. In this way, there is no need to provide the coating film 1024 and the dichroic film 1025.

In some embodiments, as shown in FIGS. 18A and 18B, the combining component 102 further includes an anti-reflection film 1026. The anti-reflection film 1026 is located on the surface of the first substrate 1023 away from the converging lens group 105. Alternatively, the anti-reflection film 1026 is located at the parts of the first substrate 1023 that are corresponding to the transmitting portions and on the surface of the first substrate 1023 away from the converging lens group 105. The anti-reflection film 1026 may increase transmittance of light of a full spectrum, or the anti-reflection film 1026 only increases transmittance of the laser beams (e.g., the blue laser beams) emitted by the light-emitting assembly 101, which is not limited in the present disclosure.

In FIGS. 18A and 18B, the first transmitting portion 1041A, the second transmitting portion 1041B, the first reflecting portion 1042A, and the second reflecting portion 1042B are shown with dotted frames.

The converging lens group 105 is located between the combining component 102 and the phosphor wheel 103, and is disposed in the beam paths where the first laser beam S1 and the second laser beam S2 are incident on the phosphor wheel 103. The converging lens group 105 is configured to converge the laser beams, thereby forming a small beam spot on the phosphor wheel 103. The converging lens group 105 is further configured to collimate the laser beams reflected by the phosphor wheel 103 or the fluorescent beams excited by the phosphor wheel 103, so that the laser beams reflected by the phosphor wheel 103 or the fluorescent beams excited by the phosphor wheel 103 are incident on the combining component 102.

The converging lens group 105 includes a convex lens, and a convex arc surface of the convex lens protrudes toward the light-emitting assembly 101.

In a case where the converging lens group 105 includes a plurality of convex lenses, the plurality of convex lenses may be arranged in sequence along an arrangement direction of the combining component 102 and the phosphor wheel 103, and optical axes of the plurality of convex lenses are collinear. In this way, the laser beams entering the converging lens group 105 may be converged on the phosphor wheel 103 more accurately, and the laser beams reflected by the phosphor wheel 103 or the fluorescent beams excited by the phosphor wheel 103 may be incident on the combining component 102 more accurately.

In some embodiments, as shown in FIG. 12A, the converging lens group 105 includes two convex lenses, that is, one plano-convex lens 1051 and one plano-convex lens 1052.

Alternatively, the converging lens group 105 includes one hyperspherical convex lens and one plano-convex lens.

Alternatively, the converging lens group 105 includes one positive meniscus lens and one plano-convex lens.

Some embodiments of the present disclosure are mainly described by taking an example in which the converging lens group 105 includes two convex lenses, however, this should not be construed as a limitation of the present disclosure.

In some embodiments, the first laser beam S1 and the second laser beam S2 emitted by the light-emitting assembly 101 are incident at different positions of the converging lens group 105 respectively, and are asymmetrical with respect to an optical axis of the converging lens group 105, and both are incident on the phosphor wheel 103 after being converged by the converging lens group 105.

According to the law of reflection, in a case where the first laser beam S1 and the second laser beam S2 are asymmetric with respect to the optical axis of the converging lens group 105, a beam path of a first fluorescent beam E1 generated by the first laser beam S1 does not overlap with a beam path of the second laser beam S2, and a beam path of a second fluorescent beam E2 generated by the second laser beam S2 does not overlap with a beam path of the first laser beam S1. As a result, the first laser beam S1 and the second laser beam S2 may be transmitted by the combining component 102, and the first fluorescent beam E1 and the second fluorescent beam E2 may be reflected by the combining component 102.

In some embodiments, the first laser beam S1 and the second laser beam S2 exit from the light-emitting assembly 101 simultaneously, which may be regarded as simultaneously exciting the fluorescence-exciting region 1031 or being reflected by the laser-reflecting region 1032 of the phosphor wheel 103.

For example, as shown in FIG. 12A, as the phosphor wheel 103 rotates, in a case where the fluorescence-exciting region 1031 is irradiated by the first laser beam S1 and the second laser beam S2, the fluorescence-exciting region 1031 may be excited to generate the first fluorescent beam E1 corresponding to the first laser beam S1 and the second fluorescent beam E2 corresponding to the second laser beam S2 respectively. The excited first fluorescent beam E1 and the excited second fluorescent beam E2 are both reflected by the phosphor wheel 103 and transmitted through the converging lens group 105.

The first fluorescent beam E1 transmits through the converging lens group 105 and then incident on the first reflecting region 1022A, and the second fluorescent beam E2 transmits through the converging lens group 105 and then incident on the second reflecting region 1022B. The first fluorescent beam E1 and the second fluorescent beam E2 may be regarded as being excited simultaneously, and are reflected by the phosphor wheel 103 and are collimated by the converging lens group 105. Therefore, the first fluorescent beam E1 and the second fluorescent beam E2 are incident on the first reflecting region 1022A and the second reflecting region 1022B simultaneously, and are reflected by the first reflecting region 1022A and the second reflecting region 1022B toward the beam outlet of the laser source 100. Here, colors of the first fluorescent beam E1 and the second fluorescent beam E2 are different from the colors of the laser beams emitted by the light-emitting assembly 101.

As shown in FIG. 12B, as the phosphor wheel 103 rotates, when the laser-reflecting region 1032 is irradiated by the first laser beam S1 and the second laser beam S2, the laser-reflecting region 1032 reflects the first laser beam S1 and the second laser beam S2. The reflected first laser beam S1 is transmitted through the converging lens group 105 and then incident on the first reflecting region 1022A, and the reflected second laser beam S2 is transmitted through the converging lens group 105 and then incident on the second reflecting region 1022B. The first reflecting region 1022A and the second reflecting region 1022B reflect the laser beams toward the beam outlet of the laser source 100.

The colors of the first fluorescent beam E1 and the second fluorescent beam E2 are different from the colors of the laser beams emitted by the light-emitting assembly 101. Therefore, the laser beams and the fluorescent beams with different colors are reflected toward the beam outlet of the laser source 100 by the combining component 102, so that the beam outlet of the laser source 100 sequentially exits the laser beams and the fluorescent beams with different colors.

In some embodiments, as shown in FIG. 12A, a line connecting a position C where the first laser beam S1 is incident on the converging lens group 105 and a convergence position E where the first laser beam S1 converges on the phosphor wheel 103 is a first connecting line CE, and an acute angle of included angles between the first connecting line CE and the optical axis H of the converging lens group 105 is $\alpha$. A line connecting a position D where the second laser beam S2 is incident on the converging lens group 105 and a convergence position E where the second laser beam S2 converges on the phosphor wheel 103 is a second connecting line DE, and an acute angle of included angles between the second connecting line DE and the optical axis H of the converging lens group 105 is $\beta$. The included angle $\alpha$ and the included angle $\beta$ satisfy that $\alpha$ and $\beta$ are not equal to each other (i.e., $\alpha \neq \beta$).

In some embodiments, as shown in FIG. 12A, a distance L1 between the position C where the first laser beam S1 is incident on the converging lens group 105 and the optical axis H of the converging lens group 105 is different from a distance L2 between the position D where the second laser beam S2 is incident on the converging lens group 105 and the optical axis H of the converging lens group 105, that is, L1 and L2 are not equal to each other (i.e., L1$\neq$L2).

It will be noted that, in a case where the included angles $\alpha$ and $\beta$ are different, or in a case where the distances L1 and L2 are different, the first laser beam S1 and the second laser beam S2 may be located at both sides of the optical axis H, or may be located at a same side of the optical axis H. Some embodiments of the present disclosure are mainly described by taking an example in which the first laser beam S1 and the second laser beam S2 are located at both sides of the optical axis H respectively.

As shown in FIG. 12B, the converging lens group 105 converges the first laser beam S1 and the second laser beam S2 on the laser receiving surface 1033 of the phosphor wheel 103, so as to form a small beam spot. In a case where the laser-reflecting region 1032 of the phosphor wheel 103 is irradiated by the first laser beam S1 and the second laser beam S2, the first laser beam S1 and the second laser beam S2 may be reflected by the laser-reflecting region 1032 of the phosphor wheel 103. After being transmitted through the converging lens group 105 again, the first laser beam S1 and the second laser beam S2 reflected by the laser-reflecting region 1032 are incident on the first reflecting region 1022A and the second reflecting region 1022B, and are reflected by the first reflecting region 1022A and the second reflecting region 1022B toward the beam outlet of the laser source 100.

It will be noted that, neither the first laser beam S1 nor the second laser beam S2 passes through the optical axis H of the converging lens group 105, and the first laser beam S1 and the second laser beam S2 are not symmetrical with respect to the optical axis H of the converging lens group 105. In a case where the laser beams are incident on the converging lens group 105 along the optical axis H of the converging lens group 105, there will be no change in optical characteristics of the laser beams. If the laser beams passing through the laser transmitting regions in the combining component 102 pass through the converging lens group 105 along the optical axis H of the converging lens group 105 and reach the phosphor wheel 103, light exiting from the phosphor wheel 103 also passes through the converging lens group 105 along the optical axis H of the converging lens group 105 and then passes through the laser transmitting regions again. As a result, the laser beams will not reach the light reflecting regions in the combining component 102, and will not be reflected to the beam outlet of the laser source 100 by the light reflecting regions. Therefore, in some embodiments, the laser beams emitted by the light-emitting assembly 101 and transmitted through the laser transmitting regions need to be irradiated to a region other than the optical axis H of the converging lens group 105.

In some embodiments, referring to FIG. 12B, the included angle $\alpha$ between the first laser beam S1 and the optical axis H of the converging lens group 105 is greater than the included angle $\beta$ between the second laser beam S2 and the optical axis H of the converging lens group 105, that is, $\alpha > \beta$. In this way, the first laser beam S1 and the second laser beam S2 may be incident on the converging lens group 105 (e.g., a lens of the converging lens group 105 that receives the laser beams first) at different incident angles. Moreover, according to the law of reflection, a reflection beam path of the first laser beam S1 will not overlap with a reflection beam path of the second laser beam S2, and the reflection beam path of the first laser beam S1 will not overlap with an incident beam path of the second laser beam S2, the reflection beam path of the second laser beam S2 will not overlap with an incident beam path of the first laser beam S1. As a result, the first laser beam S1 and the second laser beam S2 reflected by the laser-reflecting region 1032 of the phosphor wheel 103 may be incident on the first reflecting region 1022A and the second reflecting region 1022B respectively along different reflection beam paths, and reflected by the first reflecting region 1022A and the second reflecting region 1022B toward the beam outlet of the laser source 100.

In some embodiments, the combining component 102 is an integral member. The transmitting portions and the reflecting portions of the combining component 102 are arranged in a one-to-one correspondence manner. A laser beam transmitted through a transmitting portion is incident on a reflecting portion corresponding to the transmitting portion of the combining component 102 after being reflected by the laser-reflecting region 1032 of the phosphor wheel 103. After a laser beam transmitted through a transmitting portion is incident on the fluorescence-exciting region 1031 of the phosphor wheel 103, the excited fluorescent beam is reflected by the phosphor wheel 103 toward a reflecting portion corresponding to the transmitting portion of the combining component 102.

For example, referring to FIGS. 13A to 13B and 16A to 16B, the first transmitting portion 1041A corresponds to the first reflecting portion 1042A, and the second transmitting portion 1041B corresponds to the second reflecting portion 1042B.

In some embodiments, the transmitting portion and the corresponding reflecting portion of the combining component 102 are located at both sides of the optical axis H of the converging lens group 105 respectively. At least a portion of an orthogonal projection of the transmitting portion of the combining component 102 on the laser receiving surface 1033 of the phosphor wheel 103, and at least a portion of an orthogonal projection of the corresponding reflecting portion on the laser receiving surface 1033 of the phosphor wheel 103 are symmetrical with respect to the optical axis H.

For example, as shown in FIGS. 13A to 13B and 16A to 16B, the second transmitting portion 1041B and the corresponding second reflecting portion 1042B are located at both sides of the optical axis H of the converging lens group 105, and the first transmitting portion 1041A and the corresponding first reflecting portion 1042A are located at both sides of the optical axis H of the converging lens group 105. At least a portion of an orthogonal projection of the first transmitting portion 1041A on the laser receiving surface 1033 of the phosphor wheel 103, and at least a portion of an orthogonal projection of the corresponding first reflecting portion 1042A on the laser receiving surface 1033 of the phosphor wheel 103 are symmetrical with respect to the optical axis H. At least a portion of an orthogonal projection of the second transmitting portion 1041B on the laser receiving surface 1033 of the phosphor wheel 103, and at least a portion of an orthogonal projection of the corresponding second reflecting portion 1042B on the laser receiving surface 1033 of the phosphor wheel 103 are symmetrical with respect to the optical axis H.

In some embodiments, in a case where the combining component 102 includes the plurality of transmitting portions and the plurality of reflecting portions, the plurality of transmitting portions may be located at both sides of the optical axis H, and are asymmetrical with respect to the optical axis H.

For example, as shown in FIGS. 13A to 13B and 16A to 16B, the second transmitting portion 1041B and the first transmitting portion 1041A are also located at both sides of the optical axis H of the converging lens group 105, and are asymmetrical with respect to the optical axis H. In this way, it may be ensured that the laser beam incident on one transmitting portion will not pass through another transmitting portion.

Figure 17A:
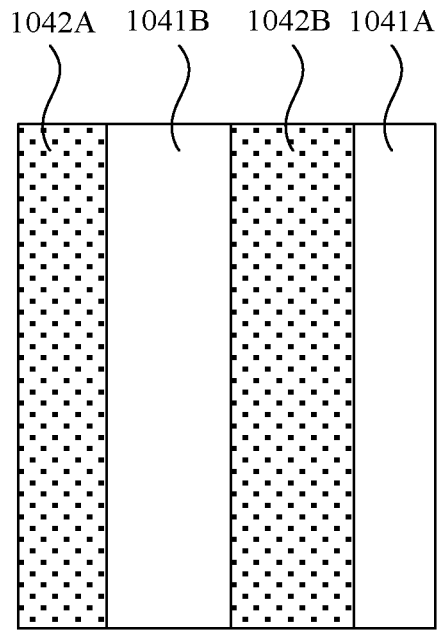
FIG. 17A is a plan view of a combining component, in accordance with some embodiments.

In some embodiments, as shown in FIG. 17A, an area of the first transmitting portion 1041A of the combining component 102 may be less than an area of the second transmitting portion 1041B, and an area of the first reflecting portion 1042A may be less than an area of the second reflecting portion 1042B.

Figure 13A:
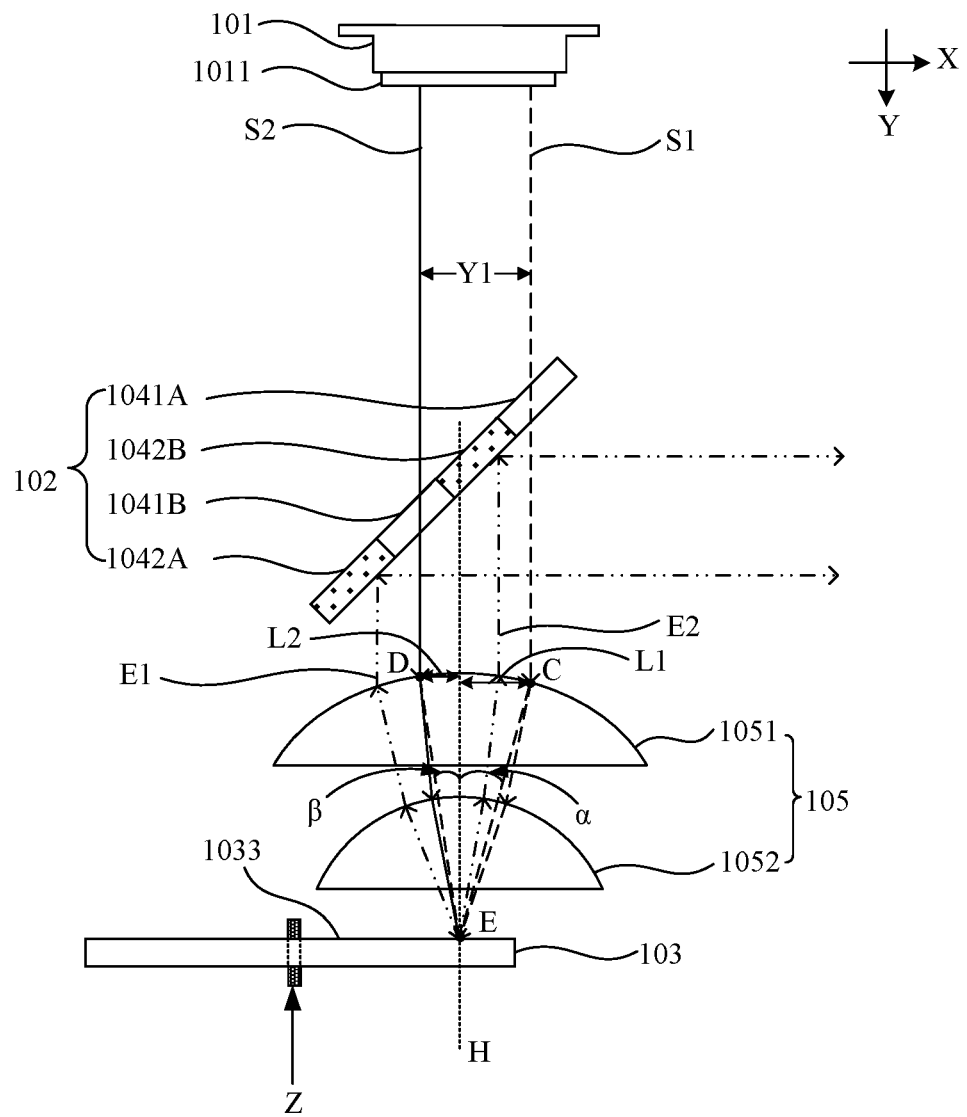
FIG. 13A is a diagram showing a beam path of yet another laser source, in accordance with some embodiments.
Figure 13B:
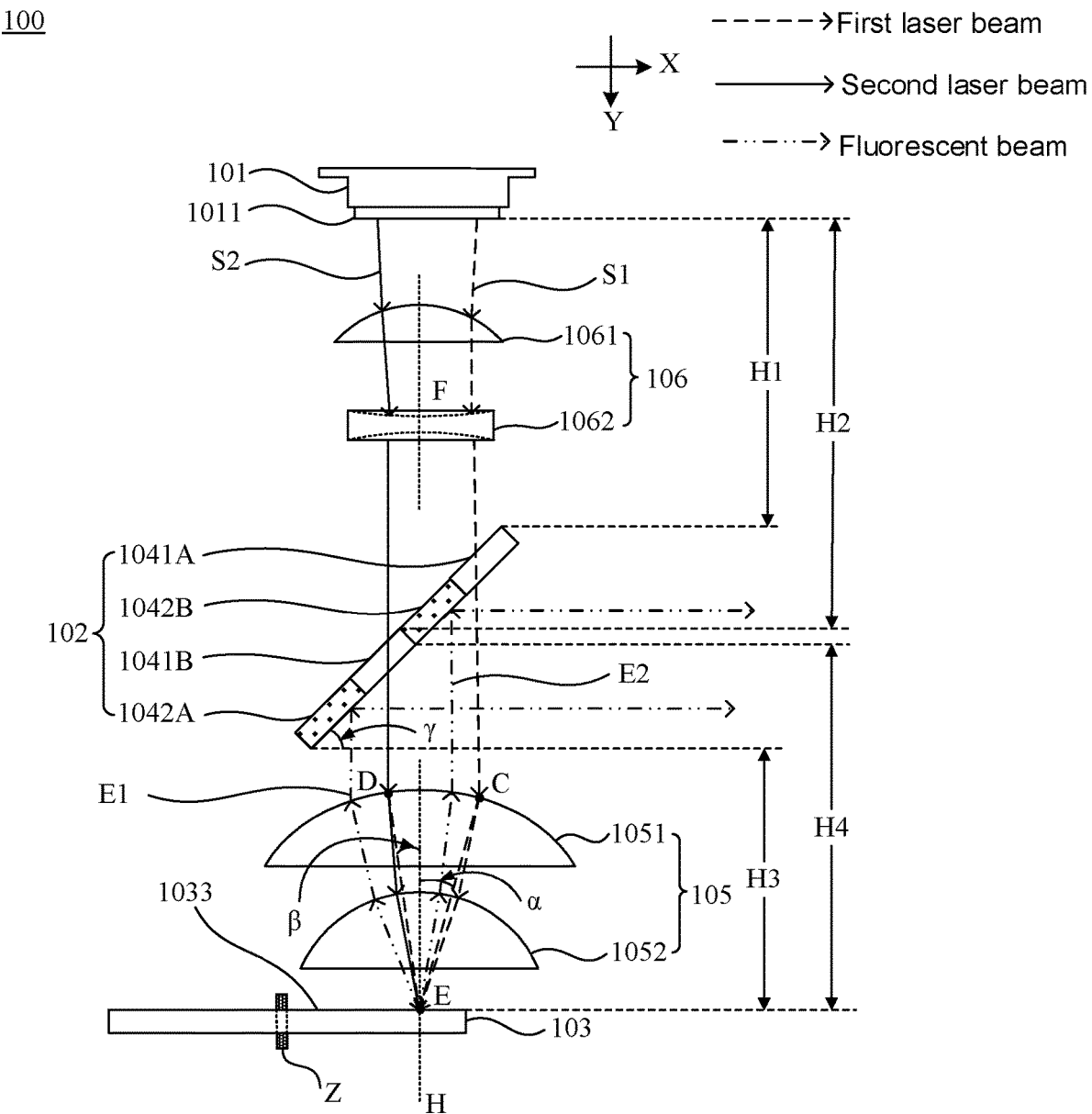
FIG. 13B is a diagram showing a beam path of yet another laser source, in accordance with some embodiments.

For example, as shown in FIG. 13B, a distance H1 between the first transmitting portion 1041A and a laser exit surface 1011 of the light-emitting assembly 101 is less than a distance H2 between the second transmitting portion 1041B and the laser exit surface 1011 of the light-emitting assembly 101. An optical path of the laser beam (e.g., the first laser beam S1) from the light-emitting assembly 101 to the first transmitting portion 1041A is shorter than an optical path of the laser beam (e.g., the second laser beam S2) from the light-emitting assembly 101 to the second transmitting portion 1041B.

A distance H3 between the first reflecting portion 1042A and the laser receiving surface 1033 of the phosphor wheel 103 is less than a distance H4 between the second reflecting portion 1042B and the laser receiving surface 1033 of the phosphor wheel 103. An optical path of light (e.g., the first laser beam S1 or the first fluorescent beam E1) from the phosphor wheel 103 to the first reflecting portion 1042A is shorter than an optical path of light (e.g., the second laser beam S2 or the second fluorescent beam E2) from the phosphor wheel 103 to the second reflecting portion 1042B.

The shorter the optical path of light, the smaller the beam spot formed. Thus, a beam spot on the first transmitting portion 1041A is smaller than a beam spot on the second transmitting portion 1041B, and a beam spot on the first reflecting portion 1042A is smaller than a beam spot on the second reflecting portion 1042B.

Therefore, the first transmitting portion 1041A only needs a small area to transmit the laser beam of the light-emitting assembly 101, and the first reflecting portion 1042A only needs a small area to reflect the incident laser beam or fluorescent beam, so the area of the first transmitting portion 1041A may be less than the area of the second transmitting portion 1041B, and the area of the first reflecting portion 1042A may be less than the area of the second reflecting portion 1042B. Similarly, in the case where the combining component 102 includes two reflectors arranged independently from each other, the area of the first transmitting region 1021A may be less than the area of the second transmitting region 1021B, and the area of the first reflecting region 1022A may be less than the area of the second reflecting region 1022B.

In some embodiments, as shown in FIGS. 12A to 12C and 13A to 13B, the laser exit surface 1011 of the light-emitting assembly 101 and the laser receiving surface 1033 of the phosphor wheel 103 are parallel to each other. The light-emitting assembly 101, the combining component 102, the converging lens group 105 and the phosphor wheel 103 are arranged in sequence along a laser exit direction of the light-emitting assembly 101. In this way, the light-emitting assembly 101 directly emits the laser beams to the transmitting portions of the combining component 102. The first laser beam S1 and the second laser beam S2 are transmitted through different transmitting portions of the combining component 102 (e.g., the first transmitting portion 1041A and the second transmitting portion 1041B) respectively, and then are incident on the converging lens group 105. Finally, the first laser beam S1 and the second laser beam S2 are incident on the phosphor wheel 103 after being converged by the converging lens group 105.

The laser exit direction of the laser source 100 (i.e., the Y direction in FIG. 13A) is parallel to an arrangement direction of the combining component 102, the converging lens group 105 and the phosphor wheel 103.

As the phosphor wheel 103 rotates, in a case where the fluorescence-exciting region 1031 is irradiated by the first laser beam S1 and the second laser beam S2, the fluorescent beams excited by the fluorescence-exciting region 1031 (e.g., the first fluorescent beam E1 and the second fluorescent beam E2) are reflected by the phosphor wheel 103, and after being transmitted through the converging lens group 105, the fluorescent beams are incident on different reflecting portions of the combining component 102 respectively. That is, the first fluorescent beam E1 is incident on the first reflecting portion 1042A of the combining component 102, and the second fluorescent beam E2 is incident on the second reflecting portion 1042B of the combining component 102. Different reflecting portions of the combining component 102 reflect the fluorescent beams toward the beam outlet of the laser source 100.

As the phosphor wheel 103 rotates, in a case where the laser-reflecting region 1032 of the phosphor wheel 103 is irradiated by the first laser beam S1 and the second laser beam S2, the first laser beam S1 and the second laser beam S2 are incident on different reflecting portions of the combining component 102 after being reflected by the laser-reflecting region 1032 of the phosphor wheel 103 and transmitted through the converging lens group 105 again. That is, the first laser beam S1 is incident on the first reflecting portion 1042A of the combining component 102 after being reflected by the laser-reflecting region 1032, and the second laser beam S2 is incident on the second reflecting portion 1042B of the combining component 102 after being reflected by the laser-reflecting region 1032. Different reflecting portions of the combining component 102 reflect the first laser beam S1 and the second laser beam S2 toward the beam outlet of the laser source 100.

In some embodiments, as shown in FIGS. 15A to 15B and 16A to 16B, the laser exit surface 1011 of the light-emitting assembly 101 is perpendicular to the laser receiving surface 1033 of the phosphor wheel 103. The laser exit surface 1011 may extend along the Y direction in FIG. 16A, and the laser receiving surface 1033 may extend along the X direction in FIG. 16A. In this case, the laser source 10 further includes a turning component 108 (e.g., a reflector). The turning component 108 is located in the laser exit direction of the light-emitting assembly 101, and is configured to reflect the laser beams emitted by the light-emitting assembly 101 into the laser receiving surface 1033 of the phosphor wheel 103.

The light-emitting assembly 101, turning component 108, the combining component 102, the converging lens group 105, and the phosphor wheel 103 are arranged in an "L" shape. That is, the laser exit direction of the light-emitting assembly 101 (e.g., the X direction in FIG. 16A) is substantially perpendicular to the arrangement direction of the turning component 108, the combining component 102, the converging lens group 105, and the phosphor wheel 103 (e.g., the Y direction in FIG. 16A). The laser beams emitted by the light-emitting assembly 101 may be reflected by the turning component 108 toward the transmitting portions of the combining component 102.

In some embodiments, the turning component 108 includes one turning mirror. The turning mirror is configured to adjust a transmitting direction of the laser beams emitted by the light-emitting assembly 101.

In some embodiments, the turning component 108 includes a plurality of turning mirrors. The plurality of turning mirrors are configured to split the laser beam emitted by the one light-emitting assembly 101, and a distance between the obtained split laser beams is adjusted through adjusting a position of each turning mirror.

Figure 16A:
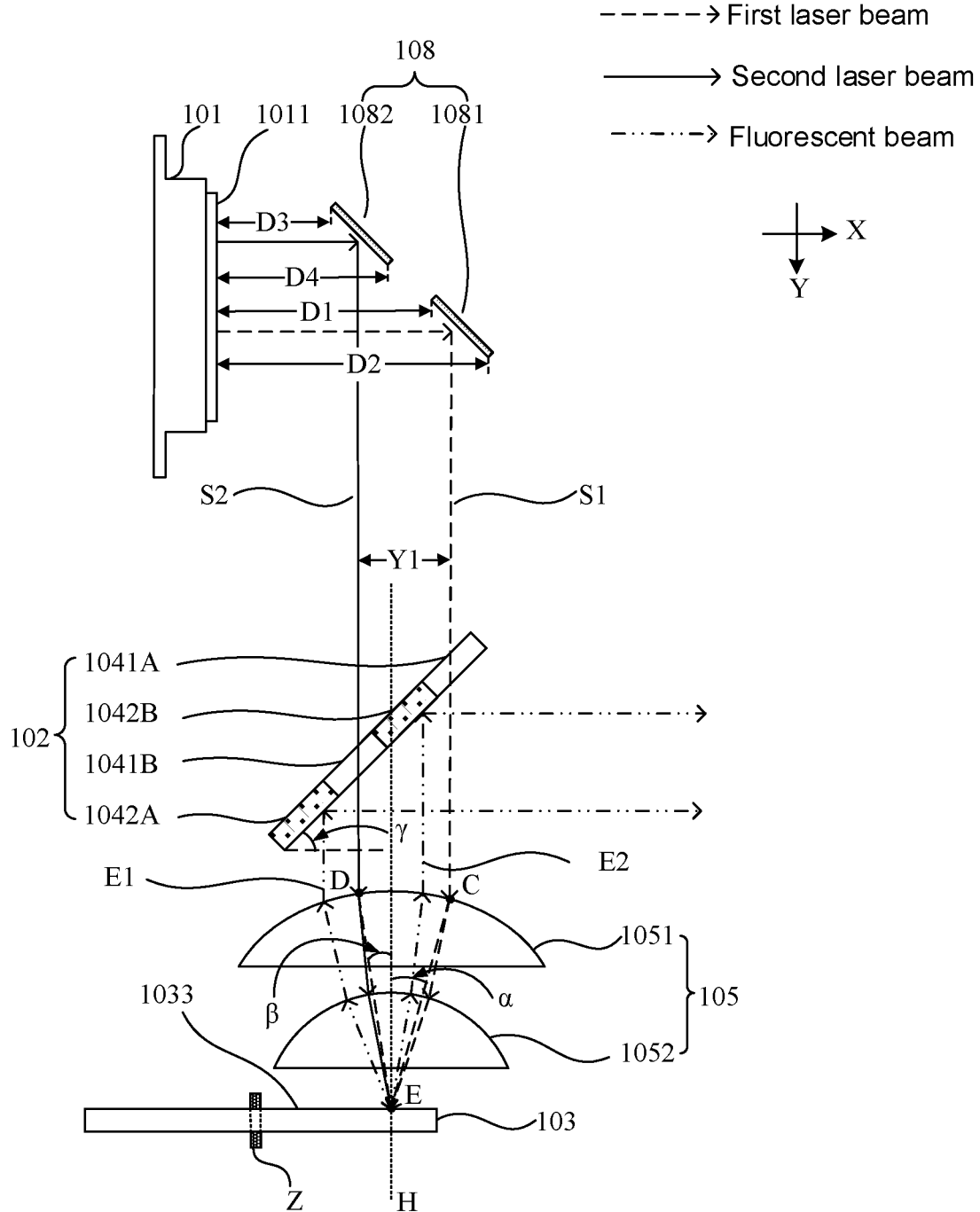
FIG. 16A is a diagram showing a beam path of yet another laser source, in accordance with some embodiments.

The plurality of turning mirrors are arranged along the laser exit direction of the light-emitting assembly 101 (referring to the X direction in FIG. 16A). Distances between the plurality of turning mirrors and the laser exit surface 1011 of the light-emitting assembly 101 are all different. The plurality of turning mirrors of the laser source 100 and the plurality of transmitting portions of the combining component 102 may be arranged in a one-to-one correspondence manner, so as to ensure that each turning mirror reflects the incident laser beam to the corresponding transmitting portion.

For ease of description, some embodiments of the present disclosure are mainly described by taking an example in which the turning component 108 includes two turning mirrors and the combining component 102 is the integral member, however, this should not be construed as a limitation of the present disclosure.

Figure 16B:
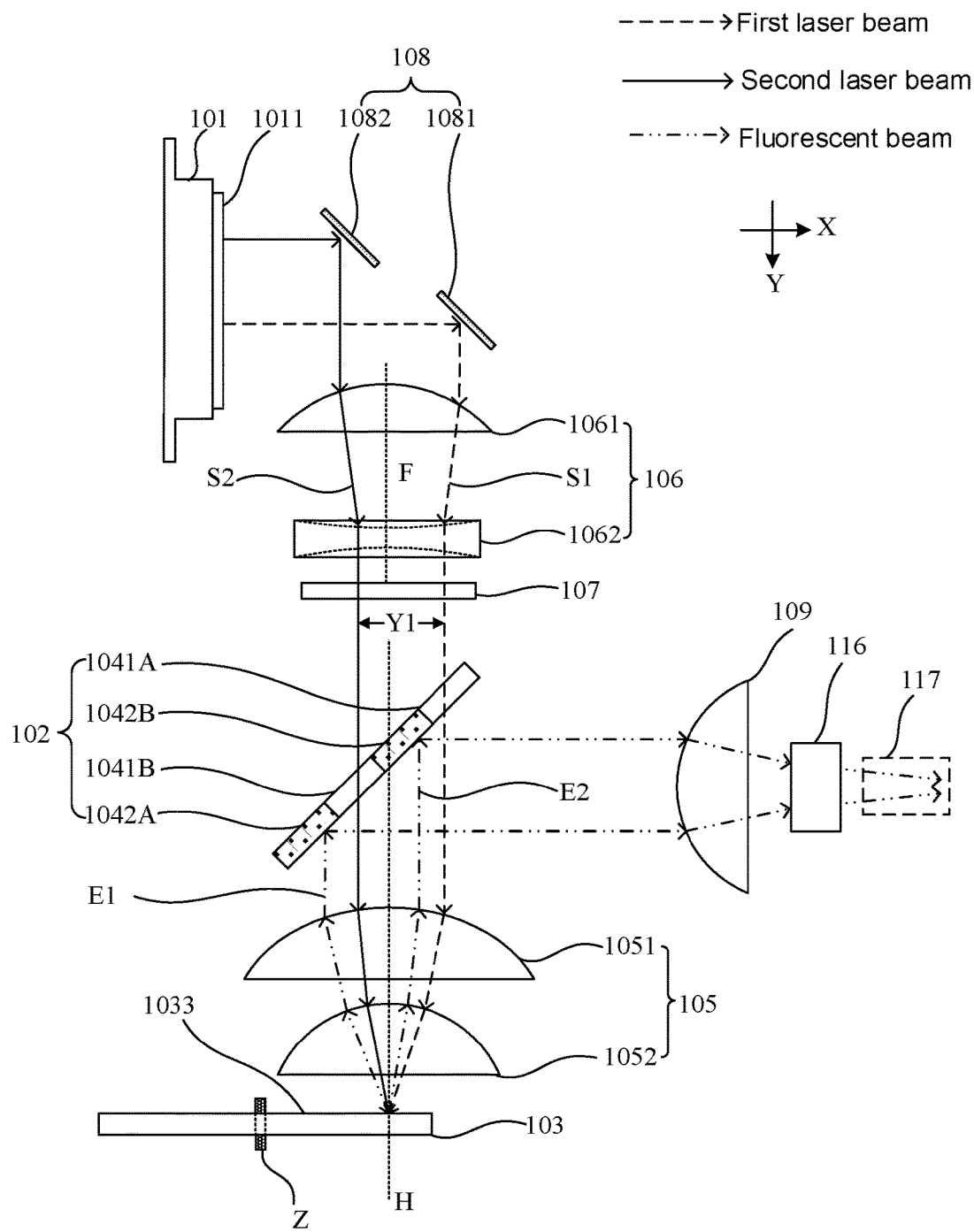
FIG. 16B is a diagram showing a beam path of yet another laser source, in accordance with some embodiments.

For example, as shown in FIGS. 16A and 16B, the turning component 108 includes two turning mirrors, that is, a first turning mirror 1081 and a second turning mirror 1082. The first turning mirror 1081 and the second turning mirror 1082 are configured to reflect different portions of the laser beam emitted by the light-emitting assembly 101, so as to form the first laser beam S1 and the second laser beam S2. Moreover, before entering the converging lens group 105, the first laser beam S1 and the second laser beam S2 are spaced apart by the first predetermined distance Y1. The range of the first predetermined distance Y1 may be referred to the above description, which will not be repeated herein.

The second turning mirror 1082 proximate to the laser exit surface 1011 of the light-emitting assembly 101 corresponds to the second transmitting portion 1041B of the combining component 102. The second turning mirror 1082 is configured to reflect the laser beam incident thereon into the second transmitting portion 1041B. The first turning mirror 1081 away from the laser exit surface 1011 of the light-emitting assembly 101 corresponds to the first transmitting portion 1041A of the combining component 102. The first turning mirror 1081 is configured to reflect the laser beam incident thereon into the first transmitting portion 1041A.

In some embodiments, a distance between each turning mirror and the laser exit surface 1011 of the light-emitting assembly 101 includes a minimum distance between any point on a surface of the turning mirror proximate to the light-emitting assembly 101 and the laser exit surface 1011 of the light-emitting assembly 101.

As shown in FIG. 16A, a minimum distance D1 between the first turning mirror 1081 and the laser exit surface 1011 of the light-emitting assembly 101 is greater than a maximum distance D4 between the second turning mirror 1082 and the laser exit surface 1011 of the light-emitting assembly 101. Therefore, a distance between any point of a surface of the first turning mirror 1081 proximate to the light-emitting assembly 101 and the laser exit surface 1011 of the light-emitting assembly 101 is not equal to a distance between any point of a surface of the second turning mirror 1082 proximate to the light-emitting assembly 101 and the laser exit surface 1011 of the light-emitting assembly 101.

For example, as shown in FIG. 16A, the minimum distance between the first turning mirror 1081 and the laser exit surface 1011 of the light-emitting assembly 101 is D1. A maximum distance between the first turning mirror 1081 and the laser exit surface 1011 of the light-emitting assembly 101 is D2. A minimum distance between the second turning mirror 1082 and the laser exit surface 1011 of the light-emitting assembly 101 is D3. The maximum distance between the second turning mirror 1082 and the laser exit surface 1011 of the light-emitting assembly 101 is D4. D1 is not equal to D3 and D4, and D4 is not equal to D1 and D2.

The two turning mirrors satisfy that an orthogonal projection of the first turning mirror 1081 on the laser exit surface 1011 of the light-emitting assembly 101 does not overlap with an orthogonal projection of the second turning mirror 1082 on the laser exit surface 1011 of the light-emitting assembly 101.

At least a surface of the turning mirror facing towards the laser exit surface 1011 of the light-emitting assembly 101 is a reflective surface.

In some embodiments, both surfaces of the turning mirror are the reflective surfaces. Alternatively, only the surface of the turning mirror facing towards the laser exit surface 1011 of the light-emitting assembly 101 is the reflective surface.

In some embodiments, one light-emitting assembly 101 emits only one laser beam. The one laser beam may be incident on the two turning mirrors 1081 and 1082 and split by the two turning mirrors 1081 and 1082. Each turning mirror may reflect a portion of the one laser beam incident on the turning mirror, so that the two turning mirrors may divide the one laser beam into the first laser beam S1 and the second laser beam S2.

In some embodiments, if the MCL device includes N rows or N columns of light-emitting chips, a turning mirror is provided in the light-emitting path of every N/2 rows or every N/2 columns of light-emitting chips, and N is an even number. In this way, one laser beam may be split into two separate laser beams by means of two turning mirrors.

Figure 19A:
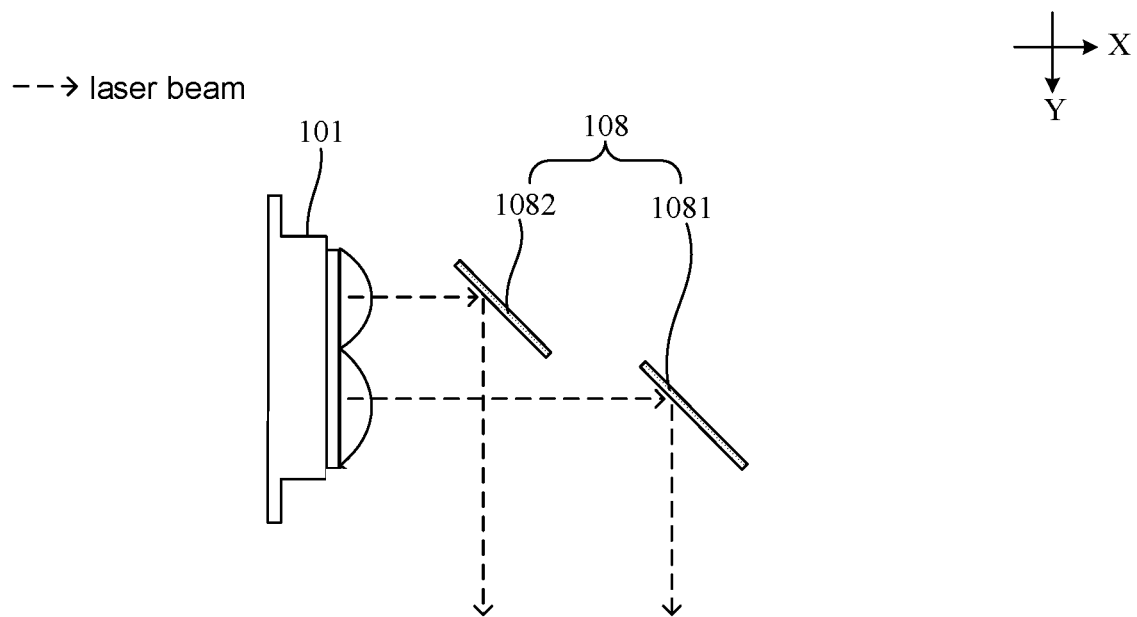
FIG. 19A is a diagram showing a beam path of a light-emitting assembly, in accordance with some embodiments.
Figure 19B:
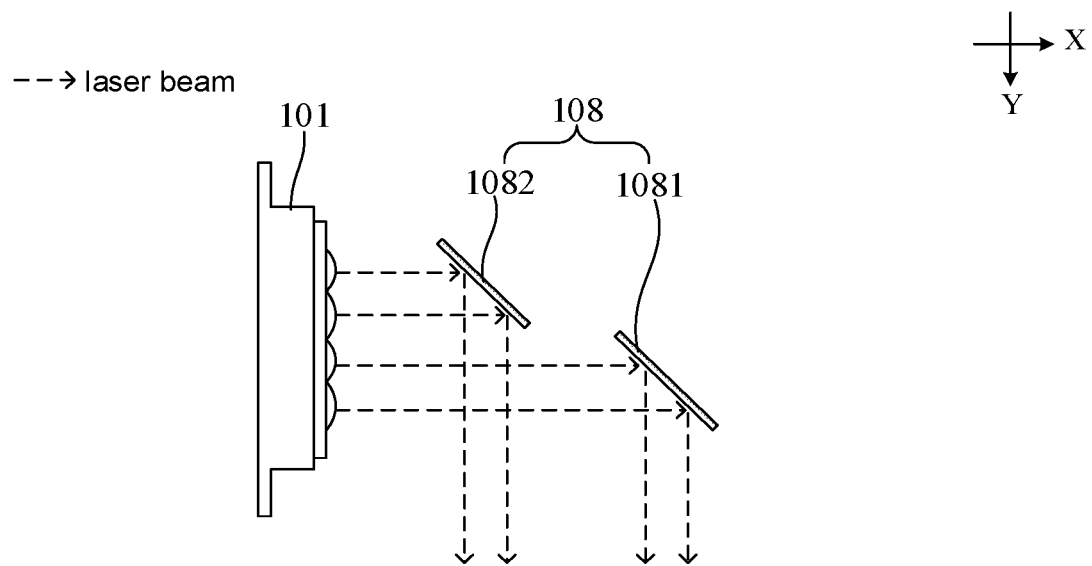
FIG. 19B is a diagram showing a beam path of another light-emitting assembly, in accordance with some embodiments.

For example, as shown in FIG. 19A, the laser 101 includes two rows or two columns of light-emitting chips, and a turning mirror 108 is disposed in the light-emitting path corresponding to each row or column of light-emitting chips. As shown in FIG. 19B, the laser 101 includes four rows or four columns of light-emitting chips, and a turning mirror 108 is disposed in the light-emitting path corresponding to every two rows or every two columns of light-emitting chips.

For example, as shown in FIGS. 19A and 19B, the greater a distance between the two turning mirrors 1081 and 1082 of the laser source 100 in the laser exit direction of the light-emitting assembly 101 (i.e., the X direction in FIG. 19A), the greater the distance between the two laser beams obtained by splitting the one laser beam emitted by the light-emitting assembly 101. Therefore, the distance between the laser beams exiting from the turning mirrors may be adjusted through adjusting the distance between the two turning mirrors 1081 and 1082 in the laser exit direction of the light-emitting assembly 101.

In some embodiments, light-emitting assemblies 101 may emit a plurality of laser beams, and the plurality of laser beams may be incident on the two turning mirrors 1081 and 1082 respectively. Since the laser beams are a high-energy beam, if an energy density of a single laser beam is increased to increase a luminous power of the fluorescent beam, not only will the reliability of an optical element in the beam path be reduced, but also the optical element needs to be heat-resistant, thereby resulting in an increase in a cost of the optical path structure. Moreover, it is also possible to reduce a conversion efficiency of the fluorescent beam due to that the irradiation of light beam with a high energy density causes a heat dissipation problem of the phosphor wheel 103.

To this end, in some embodiments of the present disclosure, by providing two laser beams, and making the two laser beams asymmetrical with respect to the optical axis of each optical element, so that different two laser beams irradiate at different positions of a same optical element in the beam path of the laser beams, the problem of aging or performance degradation caused by localized exposure of the optical element to high-energy beams over a long period of time may be improved.

In addition, by making the positions where the two laser beams irradiate the converging lens group 105 asymmetrical with respect to the optical axis H, angles of the laser beams incident on the phosphor wheel 103 are also not same (i.e., a #(3), thereby avoiding a situation that the first laser beam S1 is reflected by the laser-reflecting region 1032 into the transmitting portion where the second laser beam S2 is incident on, when the first laser beam S1 converges on the laser-reflecting region 1032 of the phosphor wheel 103; or avoiding a situation that the second laser beam S2 is reflected by the laser-reflecting region 1032 into the transmitting portion where the first laser beam S1 is incident on, when the second laser beam S2 converges on the laser-reflecting region 1032 of the phosphor wheel 103. In a case where the two laser beams converge on the laser-reflecting region 1032 of the phosphor wheel 103, the two laser beams are transmitted through the converging lens group 105 again after being reflected, and exit according to the law of reflection.

Similarly, in a case where the two laser beams converge on the fluorescence-exciting region 1031 of the phosphor wheel 103, the two laser beams excite the fluorescence-exciting region 1031 to generate two fluorescent beams. After the two fluorescent beams are reflected by the phosphor wheel 103, they exit to different reflecting portions (i.e., the first reflecting portion 1042A and the second reflecting portion 10426) through the converging lens group 105. The reflecting portions may reflect the two laser beams and the two fluorescent beams in a same direction (i.e., the beam outlet of the laser source 100), so as to accomplish combination of beams.

Therefore, as the phosphor wheel 103 rotates, the laser source 100 may sequentially output the laser beams and the fluorescent beams.

Moreover, in some embodiments of the present disclosure, by arranging the laser-reflecting region 1032 on the phosphor wheel 103, there is no need to provide the transmitting region of the phosphor wheel 103 and the relay loop cooperated with the transmitting region. As a result, the optical elements of the laser source 100 are few, the optical path structure is compact, and not only the high luminous power may be achieved, but also the volume of the laser source 10 may be reduced.

In some embodiments, as shown in FIGS. 12C, 13B, 15B and 16B, the laser source 100 further comprises a beam contraction lens group 106. The beam contraction lens group 106 is located between the light-emitting assembly 101 and the combining component 102. The beam contraction lens group 106 is configured to contract beam spots of the first laser beam S1 and the second laser beam S2 emitted by the light-emitting assembly 101. The beam contraction lens group 106 may make the laser beams exiting from the beam contraction lens group 106 thinner than the laser beams entering the beam contraction lens group 106.

In some embodiments, the beam contraction lens group 106 is a telescopic lens group. For example, the beam contraction lens group 106 includes one convex lens 1061 and one concave lens 1062. The convex lens 1061 is closer to the light-emitting assembly 101 than the concave lens 1062.

In some embodiments, an optical axis F of the beam contraction lens group 106 is substantially collinear with the optical axis H of the converging lens group 105.

In some embodiments, positions where the first laser beam S1 and the second laser beam S2 are incident on the beam contraction lens group 106 are different and asymmetrical with respect to the optical axis F of the beam contraction lens group 106. Neither the first laser beam S1 nor the second laser beam S2 passes through the optical axis F of the beam contraction lens group 106.

Since the fluorescent beams excited by the fluorescence-exciting region 1031 may exit in all directions, and light-emitting angles of the fluorescent beams are large, the fluorescent beams excited by the fluorescence-exciting region 1031 may not only exit to the reflecting portions of the combining component 102, but also may exit to the transmitting portions of the combining component 102.

Figure 17B:
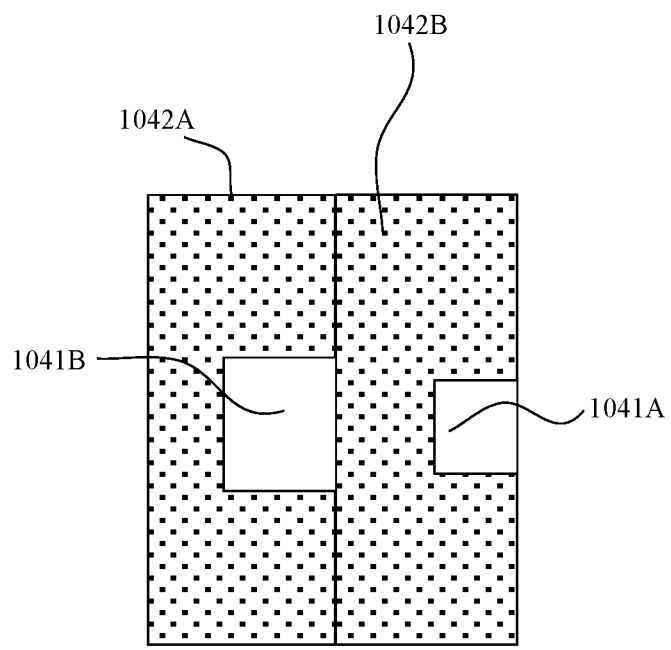
FIG. 17B is a plan view of another combining component, in accordance with some embodiments.

In order to improve an utilization rate of the fluorescent beams, in some embodiments, as shown in FIG. 17B, an area of the first transmitting portion 1041A is substantially equal to an area of a beam spot of the first laser beam S1 after it has been contracted by the beam contraction lens group 106, so that the contracted first laser beam S1 may pass through the first transmitting portion 1041A. An area of the second transmitting portion 1041B is substantially equal to an area of a beam spot of the second laser beam S2 after it has been contracted by the beam contraction lens group 106, so that the contracted second laser beam S2 may pass through the second transmitting portion 1041B. Thus, a phenomenon that the fluorescent beams excited by the phosphor wheel 103 leak out of the transmitting portions is reduced. In this way, not only is the utilization rate of the fluorescent beams improved, but also the first reflecting portion 1042A and the second reflecting portion 1042B are prevented from blocking the laser beams.

For example, as shown in FIG. 13B, the light-emitting assembly 101 may emit one laser beam, and the one laser beam is split into two laser beams by the two turning mirrors 1081 and 1082, and the two laser beams are incident on the beam contraction lens group 106 through the reflection of the two turning mirrors 1081 and 1082. Neither the first laser beam S1 nor the second laser beam S2 passes through the optical axis F of the beam contraction lens group 106. After being contracted by the beam contraction lens group 106, the first laser beam S1 and the second laser beam S2 both become thin, and avoid the first reflecting portion 1042A and the second reflecting portion 1042B, and are transmitted through the first transmitting portion 1041A and the second transmitting portion 1041B to the converging lens group 105 respectively.

The first laser beam S1 and the second laser beam S2 which have been contracted are irradiated to different positions of the converging lens group 105, and are incident on a substantially same position of the phosphor wheel 103 after being converged, so as to excite the fluorescence-exciting region 1031 of the phosphor wheel 103, or be reflected by the laser-reflecting region 1032 of the phosphor wheel 103. The first laser beam S1 and the second laser beam S2 reflected by the phosphor wheel 103, and the first fluorescent beam E1 and the second fluorescent beam E2 excited by the phosphor wheel 103 all sequentially exit to the first reflecting portion 1042A and the second reflecting portion 1042B, and are reflected by the first reflecting portion 1042A and the second reflecting portion 1042B toward the beam outlet of the laser source 100, so that the beams of three primary colors are sequentially output to form the illumination beams.

In some embodiments, as shown in FIG. 16B, the laser source 100 further includes a light homogenizing member 107 located between the beam contraction lens group 106 and the combining component 102.

The first laser beam S1 and the second laser beam S2 also pass through the light homogenizing member 107 after being transmitted through the beam contraction lens group 106 and before being incident on the converging lens group 105. The laser beams emitted by the light-emitting assembly 101 are incident on the homogenizing member 107 after being contracted by the beam contraction lens group 106. The light homogenizing member 107 may homogenize the incident first laser beam S1 and the incident second laser beam S2, thereby homogenizing the energy density of the laser beams, which is conducive to improving the conversion efficiency of the fluorescence excitation.

In some embodiments, the light homogenizing member 107 may be a light homogenizing lens (e.g., a diffusion sheet). Alternatively, the light homogenizing member 107 may also be a fly-eye lens.

It will be noted that, when the laser projection apparatus 1 performs projection display, a speckle effect is usually generated. The speckle effect refers to an effect in which two laser beams emitted by a coherent beam source interfere in space after they scatter when they irradiate a rough object (e.g., the projection screen 20 of the laser projection apparatus 1), and finally a granular bright and dark spot appears on the projection screen 20. The speckle effect makes a display effect of the projected image poor, and these bright and dark unfocused spots are in a flickering state in the human eyes, which is prone to dizziness when viewed for a long time.

In some embodiments, the laser beams emitted by the light-emitting assembly 101 may be uniform under an action of the light homogenizing member 107 (e.g., the diffusion sheet or the fly-eye lens), so that these laser beams may generate weak interference during projection. As a result, the speckle effect of the laser projection apparatus 1 during projection display may be reduced, the blurring of the projected image may be avoided, the display effect of the projected image may be improved, and the dizziness caused by human eyes may be reduced.

In some embodiments, as shown in FIG. 16B, the laser source 10 further includes a light collection member 116 located at the beam outlet 117 of the laser source 100. Alternatively, the laser source 100 further includes a condensing lens 109 and a light collection member 116. The light collection member 112 is closer to the beam outlet 117 of the laser source 100 than the condensing lens 109.

In some embodiments, the two laser beams incident on the laser reflecting region 1032 of the phosphor wheel 103 and the fluorescent beams excited by the fluorescence-exciting region 1031 are all combined by a same combining component 102 after being reflected by the phosphor wheel 103, and are all reflected by the combining component 102 toward the beam outlet 117 of the laser source 10. As a result, combination of the laser beams and the excited fluorescent beams are achieved through a compact beam path structure and a few optical elements, thereby ensuring that the volume of the laser source 100 is also small.

In addition, since the laser beams reflected by the phosphor wheel 103 and the fluorescent beams excited by the phosphor wheel 103 may be emitted to the beam outlet of the laser source 100 only once through the combining component 102, a loss of the laser beams and the fluorescent beams is reduced, and a light utilization rate is improved.

The foregoing descriptions are merely specific implementations of the present disclosure, but the protection scope of the present disclosure is not limited thereto. Any person skilled in the art could conceive of changes or replacements within the technical scope of the present disclosure, which shall be included in the protection scope of the present disclosure. Therefore, the protection scope of the present disclosure shall be subject to the protection scope of the claims.

What is claimed is:

1. A laser source, comprising:
a light-emitting assembly configured to emit a laser beam;
a phosphor wheel including a fluorescence-exciting region and a laser-reflecting region, the fluorescence-exciting region being configured to emit, under excitation of the laser beam emitted by the light-emitting assembly, a fluorescent beam with a color different from a color of the laser beam, and the laser-reflecting region being configured to reflect the laser beam emitted by the light-emitting assembly;
a converging lens group disposed between the light-emitting assembly and the phosphor wheel, and configured to converge the laser beam emitted by the light-emitting assembly to the phosphor wheel; and
a combining component disposed between the light-emitting assembly and the converging lens group;
wherein the combining component has a plurality of light reflecting regions and a plurality of laser transmitting regions, the plurality of light reflecting regions and the plurality of laser transmitting regions are alternately arranged, the plurality of laser transmitting regions are configured to transmit the laser beam emitted by the light-emitting assembly, and the plurality of light reflecting regions are configured to reflect a laser beam reflected by the laser-reflecting region of the phosphor wheel and a fluorescent beam excited by the fluorescence-exciting region of the phosphor wheel toward a beam outlet of the laser source;

wherein the combining component includes a plurality of reflectors, a gap is provided between two adjacent reflectors, each reflector is located in a corresponding light reflecting region, and a region of a side of each reflector constitutes a laser transmitting region; or, the combining component includes a plurality of reflecting portions and a plurality of transmitting portions, the plurality of reflecting portions and the plurality of transmitting portions are alternately arranged, each reflecting portion is located in a corresponding light reflecting region, and each transmitting portion is located in a corresponding laser transmitting region;

wherein the plurality of light reflecting regions include a first reflecting region and a second reflecting region, the first reflecting region is located at an end of the combining component proximate to the phosphor wheel;

the plurality of laser transmitting regions include a first transmitting region and a second transmitting region, the first transmitting region is located at an end of the combining component away from the phosphor wheel;

the laser beam includes a first laser beam and a second laser beam, the first laser beam and the second laser beam are asymmetrical with respect to an optical axis of the converging lens group, the first laser beam enters the phosphor wheel through the first transmitting region, and the second laser beam enters the phosphor wheel through the second transmitting region; and the fluorescent beam includes a first fluorescent beam and a second fluorescent beam, the fluorescence-exciting region of the phosphor wheel is excited to emit the first fluorescent beam by the first laser beam, and the fluorescence-exciting region of the phosphor wheel is excited to emit the second fluorescent beam by the second laser beam.

2. The laser source according to claim 1, wherein an acute angle of included angles between a first connecting line and the optical axis of the converging lens group is not equal to an acute angle of included angles between a second connecting line and the optical axis of the converging lens group, in which the first connecting line passes through a position where the first laser beam is incident on the converging lens group and a convergence position where the first laser beam converges on the phosphor wheel, and the second connecting line passes through a position where the second laser beam is incident on the converging lens group and a convergence position where the second laser beam converges on the phosphor wheel; or, a distance between the position where the first laser beam is incident on the converging lens group and the optical axis of the converging lens group is not equal to a distance between the position where the second laser beam is incident on the converging lens group and the optical axis of the converging lens group.

3. The laser source according to claim 1, wherein a wavelength range of the first laser beam overlaps with a wavelength range of the second laser beam.

4. The laser source according to claim 1, wherein a laser exit surface of the light-emitting assembly is perpendicular to a laser receiving surface of the phosphor wheel, and the laser source further comprises:

a turning component located in a laser exit direction of the light-emitting assembly, and configured to reflect the laser beam emitted by the light-emitting assembly to the laser receiving surface of the phosphor wheel.

5. The laser source according to claim 4, wherein the turning component include a plurality of turning mirrors configured to split the laser beam emitted by the light-emitting assembly, and a distance between split laser beams is adjusted through adjusting a position of each turning mirror.

6. The laser source according to claim 5, wherein the plurality of turning mirrors include a first turning mirror and a second turning mirror;

a distance between any point of a surface of the first turning mirror proximate to the light-emitting assembly and the laser exit surface of the light-emitting assembly is not equal to a distance between any point of a surface of the second turning mirror proximate to the light-emitting assembly and the laser exit surface of the light-emitting assembly; and an orthogonal projection of the first turning mirror on the laser exit surface of the light-emitting assembly does not overlap with an orthogonal projection of the second turning mirror on the laser exit surface of the light-emitting assembly.

7. The laser source according to claim 1, wherein an area of the first transmitting region is smaller than an area of the second transmitting region, and an area of the first reflecting region is smaller than an area of the second reflecting region.

8. The laser source according to claim 1, further comprising a beam contraction lens group; wherein the beam contraction lens group is disposed in an optical path before the laser beam emitted by the light-emitting assembly reaches the phosphor wheel and is configured to contract a beam spot of the laser beam emitted by the light-emitting assembly;

an optical axis of the beam contraction lens group is substantially coincident with the optical axis of the converging lens group.

9. The laser source according to claim 8, wherein the combining component is an integral member; the plurality of reflecting portions include a first reflecting portion and a second reflecting portion, the first reflecting portion is located in the first reflecting region, and the second reflecting portion is located in the second reflecting region; the plurality of transmitting portions include a first transmitting portion and a second transmitting portion, the first transmitting portion is located in the first transmitting region, and the second transmitting portion is located in the second transmitting region; or, the combining component includes two reflectors arranged independently of each other; one of the two reflectors is located in the first reflecting region, and another of the two reflectors is located in the second reflecting region;

wherein an area of the first transmitting region is substantially equal to an area of a beam spot of the first laser beam contracted by the beam contraction lens group, and an area of the second transmitting region is substantially equal to an area of a beam spot of the second laser beam contracted by the beam contraction lens group.

10. The laser source according to claim 9, wherein at least one surface of the plurality of transmitting portions of the combining component is further configured to reflect the fluorescent beam excited by the phosphor wheel.

11. The laser source according to claim 10, wherein the combining component satisfies one of the followings:

the combining component includes:
- a first substrate;
- a coating film disposed on the first substrate and configured to reflect the laser beam reflected by the phosphor wheel or the fluorescent beam excited by the phosphor wheel; and
- a dichroic film disposed on the first substrate and configured to transmit blue light and reflect at least one of red light, yellow light, or green light;

or, the combining component includes a first substrate;

portions of the first substrate corresponding to the plurality of reflecting portions are reflective material members, and portions of the first substrate corresponding to the plurality of transmitting portions are material members with dichroism.

12. The laser source according to claim 11, wherein the first substrate is a transparent substrate;

the coating film is located on a surface of at least one side of the portions of the first substrate corresponding to the plurality of reflecting portions;

the dichroic film is located on a surface of at least one side of the portions of the first substrate corresponding to the plurality of transmitting portions.

13. The laser source according to claim 11, wherein the combining component further includes:

an anti-reflection film disposed on at least a part of a surface of the first substrate away from the converging lens group.

14. The laser source according to claim 8, further comprising:

a light homogenizing member disposed between the beam contraction lens group and the combining component, and configured to homogenize the laser beam emitted by the light-emitting assembly.

15. The laser source according to claim 1, wherein the combining component is disposed obliquely with respect to a laser receiving surface of the phosphor wheel, and the laser receiving surface is a surface of the phosphor wheel close to the light-emitting assembly.

16. The laser source according to claim 1, wherein the phosphor wheel includes a second substrate, the fluorescence-exciting region and the laser-reflecting region are both located on a surface of the second substrate facing the light-emitting assembly, and the fluorescence-exciting region and the laser-reflecting region are enclosed to provide a closed-loop.

17. The laser source according to claim 16, wherein the second substrate includes a reflective substrate;

a region of the reflective substrate on which a fluorescence material layer is provided is the fluorescence-exciting region, and a region of the reflective substrate other than the fluorescence-exciting region is the laser-reflecting region; or, the second substrate includes a non-reflective substrate and a reflective film layer disposed on the non-reflective substrate; and a region of the reflective film layer on which a fluorescence material layer is provided is the fluorescence-exciting region, and a region of the reflective film layer other than the fluorescence-exciting region is the laser-reflecting region.

18. A laser projection apparatus, comprising:

a laser source, the laser source being the laser source according to claim 1, and the laser source being configured to emit illumination beams;

an optical engine configured to modulate the illumination beams emitted by the laser source, so as to obtain projection beams; and a projection lens configured to image the projection beams.

* * * * *

UNITED STATES PATENT AND TRADEMARK OFFICE
CERTIFICATE OF CORRECTION

| | | |
|---|---|---|
| PATENT NO. | : 12,204,236 B2 | Page 1 of 1 |
| APPLICATION NO. | : 17/729489 | |
| DATED | : January 21, 2025 | |
| INVENTOR(S) | : Wei Li et al. | |

It is certified that error appears in the above-identified patent and that said Letters Patent is hereby corrected as shown below:

On the Title Page

Column 1, Item (30), replace the present listing with the following:
-- (30) Foreign Application Priority Data
Jun. 22, 2020(CN).........................202010576381.3
Jun. 22, 2020(CN).........................202010576383.2 --

Signed and Sealed this
Twenty-second Day of July, 2025

Coke Morgan Stewart
*Acting Director of the United States Patent and Trademark Office*